United States Patent
Charles et al.

(10) Patent No.: US 9,731,808 B2
(45) Date of Patent: Aug. 15, 2017

(54) UPPER JOINTS BETWEEN OUTBOARD WING BOXES AND WING CENTER SECTIONS OF AIRCRAFT WING ASSEMBLIES

(71) Applicant: The Boeing Company, Chicago, IL (US)

(72) Inventors: Jordan Daniel Charles, Seattle, WA (US); Jason Hamada, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/266,779

(22) Filed: Sep. 15, 2016

(65) Prior Publication Data

US 2017/0001707 A1   Jan. 5, 2017

Related U.S. Application Data

(63) Continuation of application No. 13/975,158, filed on Aug. 23, 2013, now Pat. No. 9,475,570.

(51) Int. Cl.
*B64C 1/00* (2006.01)
*B64C 3/00* (2006.01)
(Continued)

(52) U.S. Cl.
CPC ............. *B64C 1/26* (2013.01); *B64C 3/00* (2013.01); *B64C 3/182* (2013.01); *B64C 3/187* (2013.01);
(Continued)

(58) Field of Classification Search
CPC .... B64C 1/26; B64C 3/00; B64C 3/18; B64C 3/182; B64C 3/185; B64C 3/187
See application file for complete search history.

(56) References Cited

U.S. PATENT DOCUMENTS 7,195,418 B2* 3/2007 Durand .................... B64C 1/26
 403/217
8,016,236 B2* 9/2011 Grieve ..................... B64C 1/26
 244/119

(Continued)

FOREIGN PATENT DOCUMENTS

EP 2032432 7/2010
FR 916967 12/1946
(Continued)

OTHER PUBLICATIONS

Machine-generated English translation of the abstract of FR2970463, downloaded from espacenet.com on Nov. 25, 2014.

*Primary Examiner* — Philip J Bonzell
(74) *Attorney, Agent, or Firm* — Dascenzo Intellectual Property Law, P.C.

(57) ABSTRACT

An upper joint of a wing assembly of an aircraft includes an outboard upper wing panel, a center upper wing panel, a rib, and an upper joint assembly operatively interconnecting the outboard upper wing panel, the center upper wing panel, and the rib. For a substantial fore/aft span of the upper joint, a first subset of a plurality of center upper stringers is operatively coupled to the upper joint assembly, and a second subset of the plurality of center upper stringers terminates without being directly coupled to the upper joint assembly.

20 Claims, 10 Drawing Sheets

(51) Int. Cl.
 *B64C 5/00* (2006.01)
 *B64C 1/26* (2006.01)
 *B64C 3/18* (2006.01)

(52) U.S. Cl.
 CPC .............. *B64C 2001/0072* (2013.01); *B64C 2001/0081* (2013.01)

(56) References Cited

U.S. PATENT DOCUMENTS

| | | | |
|---|---|---|---|
| 8,177,167 B2 | 5/2012 | Meyer | |
| 8,371,532 B2 | 2/2013 | Williams et al. | |
| 8,720,824 B2 | 5/2014 | Martinez Fernandez et al. | |
| 8,770,518 B2 * | 7/2014 | Guittard | B64C 1/26 244/120 |
| 8,777,158 B2 * | 7/2014 | Erickson | B64C 1/26 244/119 |
| 8,993,084 B2 * | 3/2015 | Griess | B32B 5/26 428/60 |
| 8,993,097 B2 * | 3/2015 | Kwon | B64C 1/064 428/174 |
| 9,004,406 B2 * | 4/2015 | Soenarjo | B64C 1/26 244/123.1 |
| 9,096,324 B2 * | 8/2015 | Erickson | B64C 1/06 |
| 2006/0018710 A1 | 1/2006 | Durand et al. | |
| 2009/0065644 A1 | 3/2009 | Jacques | |
| 2011/0147521 A1 * | 6/2011 | Delahaye | B64C 1/26 244/119 |
| 2011/0303357 A1 * | 12/2011 | Plaza | B64C 3/26 156/281 |
| 2013/0020440 A1 | 1/2013 | Honorato Ruiz | |
| 2013/0062467 A1 | 3/2013 | Soenarjo | |

FOREIGN PATENT DOCUMENTS

| | | |
|---|---|---|
| FR | 2970463 | 7/2012 |
| WO | WO2012/074394 | 6/2012 |

* cited by examiner

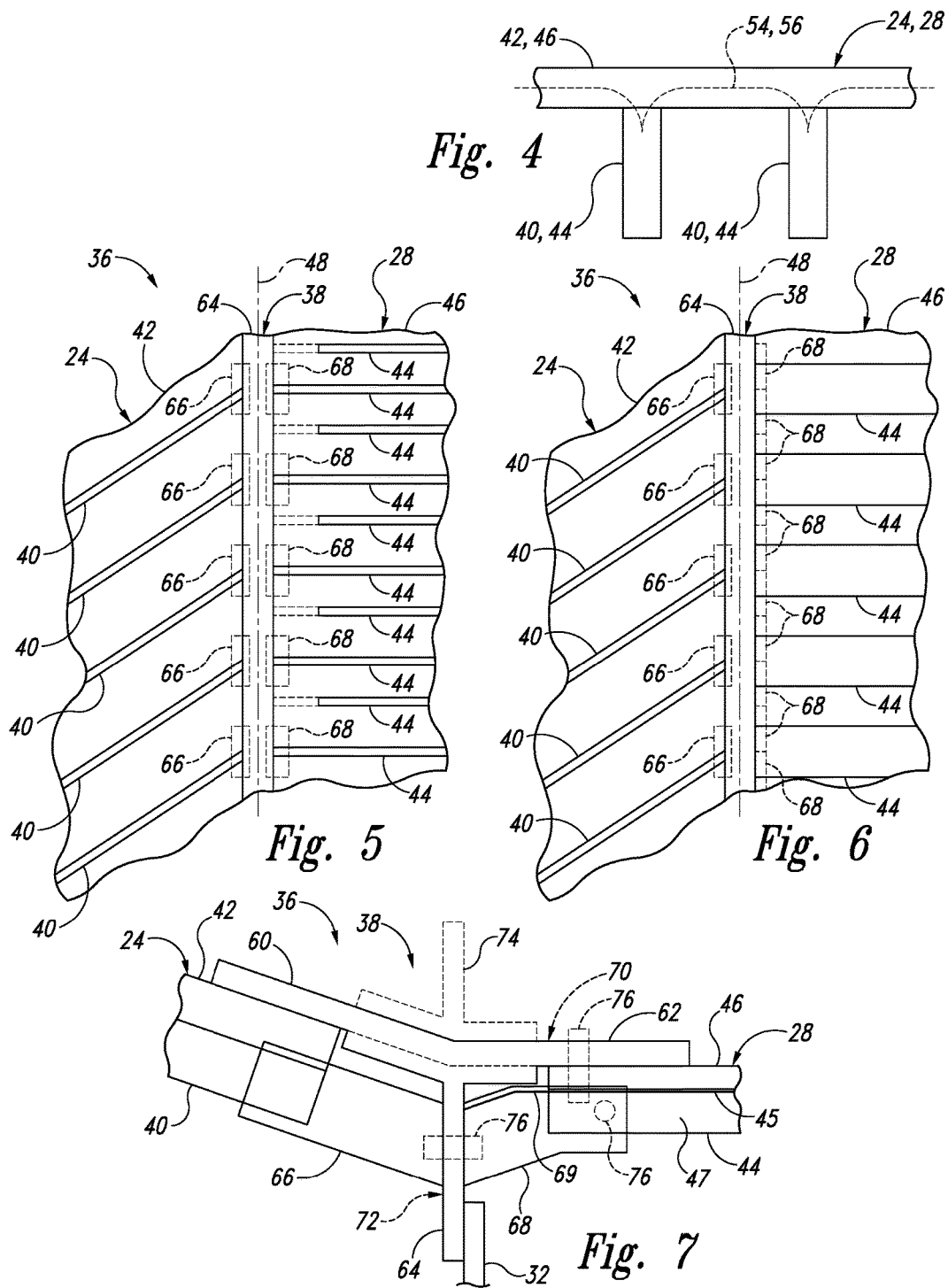

UPPER JOINTS BETWEEN OUTBOARD WING BOXES AND WING CENTER SECTIONS OF AIRCRAFT WING ASSEMBLIES

RELATED APPLICATION

The present application is a continuation of and claims priority to U.S. patent application Ser. No. 13/975,158, entitled "UPPER JOINTS BETWEEN OUTBOARD WING BOXES AND WING CENTER SECTIONS OF AIRCRAFT WING ASSEMBLIES," which was filed on Aug. 23, 2013 and issued as U.S. Pat. No. 9,475,570 on Oct. 25, 2016, and the complete disclosure of which is incorporated herein by reference.

FIELD

The present disclosure relates to upper joints between outboard wing boxes and wing center sections of aircraft wing assemblies.

BACKGROUND

Historically, the primary structural elements of aircraft have been constructed of aluminum alloys. More recently, many aircraft manufacturers utilize composite materials, such as fiber reinforced composite materials due to their high strength-to-weight ratios for various structural elements. However, the tooling and the manufacturing processes associated with such composite materials are not inexpensive. Accordingly, it may be desirable for an aircraft to utilize aluminum alloys for some structural elements and composite materials for other structural elements. However, aluminum alloys and composite materials are not typically compatible with each other from a corrosion standpoint or from a thermal expansion standpoint. Moreover, the utilization of different materials between adjacent aircraft sections presents a challenge when engineering for the transfer of significant loads from one section to another.

SUMMARY

Aircraft, wing assemblies, and upper joints of wing assemblies are disclosed herein.

In some embodiments, an upper joint for a wing assembly of an aircraft comprises an outboard upper wing panel of an outboard wing box, a center upper wing panel of a wing center section, a rib that is located between the outboard wing box and the wing center section, and an upper joint assembly operatively interconnecting the outboard upper wing panel, the center upper wing panel, and the rib. The outboard upper wing panel includes an outboard upper skin and a plurality of outboard upper stringers operatively coupled to the outboard upper skin. The center upper wing panel includes a center upper skin and a plurality of center upper stringers operatively coupled to the center upper skin. For a first substantial fore/aft span of the upper joint, the plurality of outboard upper stringers comprises hat-shaped stringers, a first subset of the plurality of center upper stringers is operatively coupled to the upper joint assembly, the first subset of the plurality of center upper stringers comprises hat-shaped stringers, a second subset of the plurality of center upper stringers terminates without being directly coupled to the upper joint assembly, and the second subset of the plurality of center upper stringers comprises blade stringers, Z-stringers, or I-stringers.

In some embodiments, for a second substantial fore/aft span of the upper joint, the plurality of outboard upper stringers comprises blade stringers, Z-stringers, or I-stringers, a third subset of the plurality of center upper stringers is operatively coupled to the upper joint assembly, the third subset of the plurality of center upper stringers comprises blade stringers, Z-stringers, or I-stringers, a fourth subset of the plurality of center upper stringers terminates without being directly coupled to the upper joint assembly, and the fourth subset of the plurality of center upper stringers comprises blade stringers, Z-stringers, or I-stringer.

BRIEF DESCRIPTION OF THE DRAWINGS

FIG. 4 is a schematic diagram representing in end view stiffened upper wing panels associated with upper joints according to the present disclosure.

FIG. 5 is a schematic diagram representing in bottom view illustrative, non-exclusive examples of upper joints according to the present disclosure.

FIG. 6 is a schematic diagram representing in bottom view illustrative, non-exclusive examples of upper joints according to the present disclosure.

FIG. 7 is a schematic diagram representing in profile view upper joints including illustrative, non-exclusive examples of upper joint assemblies according to the present disclosure.

DESCRIPTION

Figure 1:
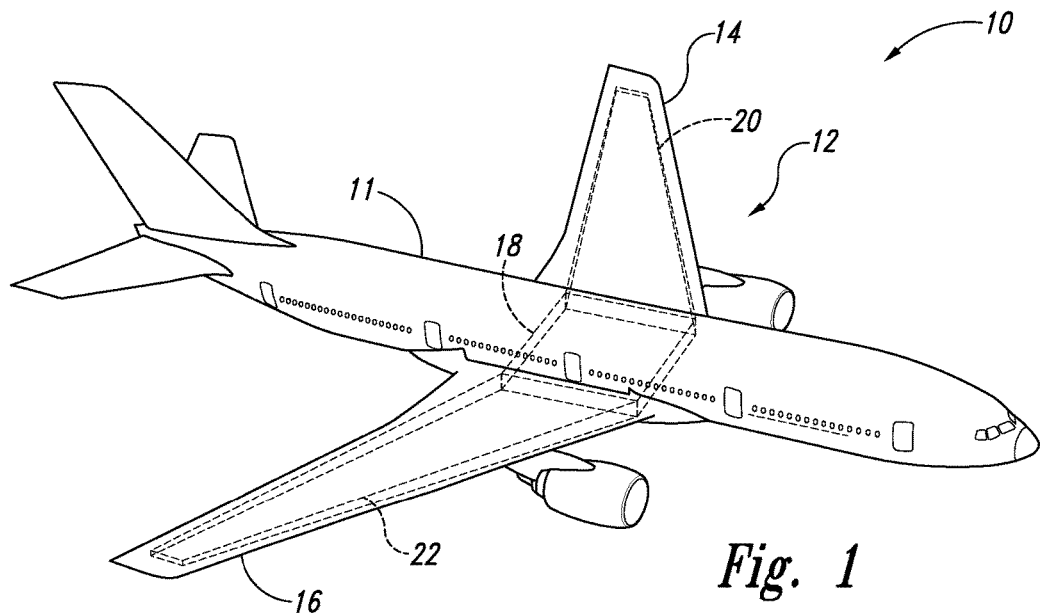
FIG. 1 is a perspective view of an aircraft.

The present disclosure relates to upper joints between outboard wing boxes and wing center sections of aircraft. As seen in FIG. 1, typical aircraft 10 include at least a fuselage 11 and a wing assembly 12 that is operatively coupled to the fuselage and that effectively carries the fuselage during flight. A typical wing assembly includes a left wing 14, a right wing 16, and a wing center section 18 that interconnects the left wing and the right wing. The left wing and the right wing additionally or alternatively may be described as, or referred to as, outboard wing sections. The wing center section may be described as the structure of the wing assembly that operatively joins the wing assembly with the fuselage. In some aircraft, the wing center section may be described as extending through the fuselage. In some aircraft, the wing center section may be described as extending beneath the fuselage. In yet other aircraft, the wing center section may be described as extending through the fuselage at the top of the fuselage and/or as extending above the fuselage.

Figure 2:
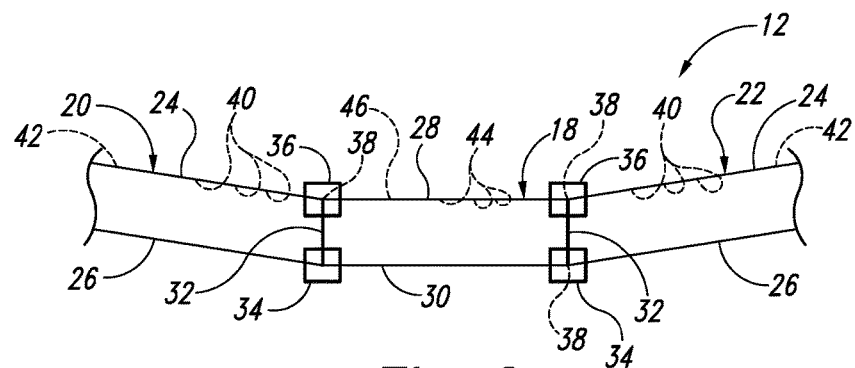
FIG. 2 is a schematic diagram representing wing assemblies according to the present disclosure.

As somewhat schematically illustrated in FIG. 1, the left wing 14 may be described as including a left wing box 20, and the right wing 16 may be described as including a right wing box 22. A wing box generally refers to the structural elements of a wing. FIG. 2 schematically illustrates, in profile, a wing assembly 12, and as seen, each wing box includes at least an outboard upper wing panel 24 and an outboard lower wing panel 26. As used herein, the relative terms 'outboard' and 'inboard' refer to the position and/or direction relative to the wing center section 18. Accordingly, the left wing box and the right wing box each may be described as an outboard wing box. The outboard upper wing panel and the outboard lower wing panel generally define the upper and lower airfoil surfaces of a wing assembly and typically include stiffeners, such as stringers, on the internal side of the wing box and that provide rigidity to the panels. Outboard wing sections typically also include such additional structural elements as a front spar that defines the leading edge of the wing and a rear spar that defines the trailing edge of the wing, as well as ribs that are spaced apart and interconnect the upper panel, the lower panel, the front spar, and the rear spar.

As schematically illustrated in FIG. 2, the wing center section 18 includes a center upper wing panel 28 and a center lower wing panel 30. A pair of ribs 32 defines interfaces between, or otherwise separates, the outboard wing boxes from the wing center section. The junction between an outboard lower wing panel 26, a center lower wing panel 30, and a rib 32 may be described as a lower joint 34, as schematically illustrated in FIG. 2. Similarly, the junction between an outboard upper wing panel 24, a center upper wing panel 28, and a rib 32 may be described as an upper joint 36. As schematically illustrated in FIG. 2, the outboard wing boxes typically extend at a dihedral angle from the wing center section. When an aircraft is on the ground, the weight of the wings generally places the upper joints 36 in tension and the lower joints 34 in compression. However, when the aircraft is airborne, the wings are providing lift to the aircraft and the weight of the fuselage relative to the wings is significant. Accordingly, during flight, the upper joints are in compression and the lower joints are in tension. These compressive and tensile forces are the primary loads for these joints, and thus the integrity of these joints is important.

In some embodiments of wing assemblies 12, the outboard wing boxes 20, 22 may be constructed substantially of a first material, while the wing center section 18 may be constructed substantially of a second material that is different from the first material. By 'constructed substantially' of a material, it is meant that at least the upper and lower panels of a wing box or a wing center section are constructed of such material, exclusive of the construction of associated fasteners, the presence of paint or other coatings, etc. Typically, however, the other structural elements, such as stiffeners, ribs, and spars, also will be constructed of such material, again exclusive of associated fasteners, paint, etc.

In some embodiments, the materials selected for construction of the outboard wing boxes 20, 22 and the wing center section 18 may differ in their thermal expansion properties. For example, in some embodiments, the outboard wing boxes may be constructed substantially of a first material that has a first coefficient of thermal expansion, and the wing center section may be constructed substantially of a second material that has a second coefficient of thermal expansion that is greater than the first coefficient of thermal expansion. In some embodiments, the coefficient of thermal expansion of the first material may be on the order of four, eight, or even ten or more times the coefficient of thermal expansion of the second material.

Additionally or alternatively, the materials selected for construction of the outboard wing boxes and the wing center section may differ in their galvanic, or electronegativity, properties. For example, the outboard wing boxes may be constructed substantially of a first material that is toward a cathodic end of a galvanic scale relative to a second material, from which the wing center section is substantially constructed. Additionally or alternatively, the first material may be more electronegative than the second material. Additionally or alternatively, the first material and the second material may be described as being galvanically incompatible. That is, the difference between the first material and the second material on a typical galvanic scale in some embodiments may be greater than 0.1, 0.15, 0.2, 0.25, 0.3, 0.35, or even 0.4 Volts.

As illustrative, non-exclusive examples, the outboard wing boxes may be constructed substantially of a fiber reinforced composite material, such as a carbon fiber reinforced polymer (CFRP) material, and the wing center section may be constructed substantially of a metal, such as of one or more aluminum alloys, including (but not limited to) a 2000 series aluminum alloy and/or a 7000 series aluminum alloy. Fiber reinforced composite materials additionally or alternatively may be described as, or referred to as, fiber reinforced polymers, or plastics. As used herein, a fiber reinforced composite material should be understood to include at least an epoxy or other polymer or binding material together with fibers, such as (but not limited to) carbon fibers, boron fibers, para-aramid (e.g., Kevlar®) fibers, and/or other fibers.

As schematically indicated in FIG. 2, an upper joint 36 of a wing assembly 12 may include an upper joint assembly, or structure, 38 that defines the upper joint together with an outboard upper wing panel 24, a center upper wing panel 28, and a rib 32. As used herein, an upper joint assembly 38 refers to a structure or assembly of structures that is distinct from an outboard upper wing panel 24, a center upper wing panel 28, and a rib 32, but that operatively interconnects an outboard upper wing panel, a center upper wing panel, and a rib to collectively define an upper joint 36 of a wing assembly 12.

In embodiments of wing assemblies 12 in which the outboard upper wing panel 24 and the center upper wing panel 28 optionally are constructed of different materials, such as that have different thermal expansion properties and/or different galvanic properties, as discussed herein, it may be desirable for the upper joint assembly 38 to be constructed substantially of a third material that is different from the materials from which the outboard upper wing panel and the center upper wing panel are constructed. In some such embodiments, this third material, from which the upper joint assembly is constructed, may have a coefficient of thermal expansion that is greater than the coefficient of thermal expansion of the material from which the outboard upper wing panel is constructed but that is less than the coefficient of thermal expansion of the material from which the center upper wing panel is constructed. Additionally or alternatively, the material from which the upper joint assembly is constructed may be between, on a galvanic scale, the materials from which the outboard upper wing panel and center upper wing panel are constructed. Additionally or alternatively, the third material from which the upper joint assembly is constructed may be more electronegative than the material from which the outboard upper wing panel is constructed and less electronegative than the material from which the center upper wing panel is constructed. Illustrative, non-exclusive examples of suitable materials for construction of an upper joint assembly 38 include titanium alloys, including grade 5, or Ti6Al4V titanium alloy.

Each outboard upper wing panel 24 may be described as a stiffened outboard upper wing panel because it may include a plurality of outboard upper stringers 40 operatively coupled to an outboard upper skin 42, as schematically indicated in FIG. 2. Similarly, the center upper wing panel 28 may be described as a stiffened center upper wing panel because it may include a plurality of center upper stringers 44 operatively coupled to a center upper skin 46, as also schematically indicated in FIG. 2. When the outboard upper wing panel and the center upper wing panel are constructed of different materials, however, the respective configurations and characteristics of the outboard upper wing panel and the center upper wing panel may be different. For example, the thicknesses of the respective skins, the shapes and configurations of the respective stringers, and/or the number of respective stringers may differ between the outboard upper wing panel and the center upper wing panel. As an illustrative, non-exclusive example, in embodiments in which the outboard upper wing panel is constructed of a fiber reinforced composite material and the center upper wing panel is constructed of aluminum, the outboard upper skin 42 may be thicker than the center upper skin 46. Additionally or alternatively, the outboard upper stringers 40 may be differently configured (e.g., have different cross-sectional profiles) than the center upper stringers 44. Illustrative, non-exclusive examples of types, or shapes, of stringers that may be used for the outboard upper stringers and/or the center upper stringers include (but are not limited to) blade stringers, Z-stringers, I-stringers, and hat-shaped stringers. Other structural differences between the outboard upper wing panel and the center upper wing panel also are within the scope of the present disclosure, including stringer configurations other than those expressly identified and/or illustrated herein.

Figure 3:
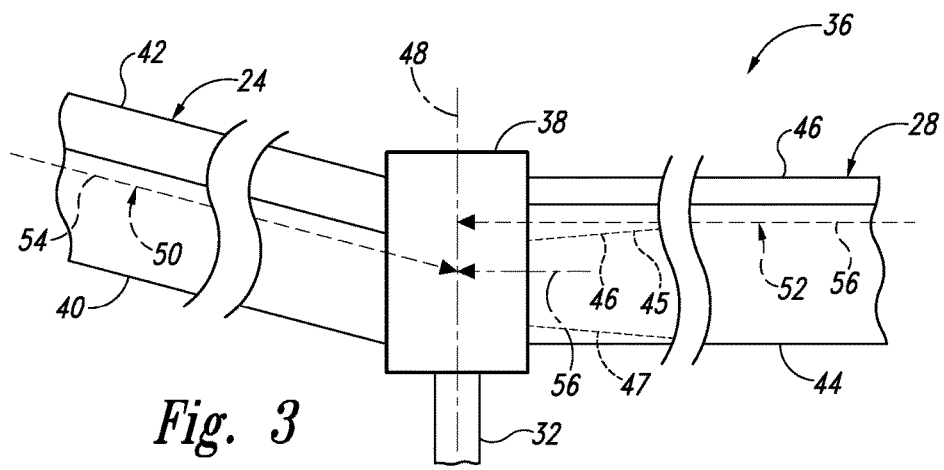
FIG. 3 is a schematic diagram representing in profile view upper joints according to the present disclosure.

FIG. 3 schematically represents in profile, an upper joint 36 including an upper joint assembly 38 interconnecting an outboard upper wing panel 24, a center upper wing panel 28, and a rib 32, with the outboard upper wing panel and the center upper wing panel schematically illustrated with different structural properties. For example, the outboard upper skin 42 is schematically represented as having a different thickness than the center upper skin 46, and an outboard upper stringer 40 having a different configuration than a center upper stringer 44. As schematically illustrated in FIG. 3 the upper joint assembly 38 may be described as defining a mating plane 48 between the outboard wing box and the wing center section.

When an upper joint 36 is in compression, such as during flight of an aircraft, the outboard upper wing panel 24 will express, or produce, a compressive inward pressure 50 toward the mating plane 48 of the upper joint assembly 38, and the center upper wing panel 28 will express, or produce, a compressive outward pressure 52 toward the mating plane of the upper joint assembly. These compressive pressures each may be described as having a centroid 54, 56, respectively, generally corresponding to a center of the respective pressures applied over a cross-section of the respective upper wing panels. That is, in cross-section along a fore/aft direction of an upper wing panel, a pressure centroid 54, 56 may generally be represented by a two-dimensional span extending along the fore/aft direction of the respective upper wing panel, as schematically illustrated in FIG. 4. The respective centroids additionally or alternatively may be described as an aggregate of more than one load line associated with the compressive inward pressure 50 and the compressive outward pressure 52. For example, more than one load line may be present in one of the outboard upper wing panel and the center upper wing panel, such as associated with the transfer of load from one component to another, such as between a stringer and a skin, between a stringer and a component of the upper joint assembly, and between a skin and a component of the upper joint assembly. Accordingly, an associated centroid may represent the theoretical center of more than one compressive load line acting on a respective upper wing panel.

As schematically illustrated in FIG. 3, in the acreage of the upper wing panels, the centroids 54, 56 across the upper wing panels 24, 28 may be generally linear, or at least generally linear away from the upper joint assembly 38. As used herein, the acreage of an upper wing panel refers to a lateral span of a respective wing panel away from the effects of the upper joint itself, with FIG. 3 schematically representing these acreages in the broken out portions of the upper wing panels. Additionally or alternatively, an acreage of an upper wing panel may be described as a distal region, or span, of the upper wing panel that is spaced away from the upper joint assembly. Additionally or alternatively, an acreage of an upper wing panel may be described as a region of the upper wing panel in which the respective centroid is generally parallel to the upper wing panel, itself. As illustrative, non-exclusive examples, the acreage of a respective wing panel may begin at greater than 0.4, 0.6, 0.8, 1.0, 1.2, or 1.4 meters away from the mating plane. Additionally or alternatively, in some embodiments, the acreage of a respective upper wing panel may include one or more of 50-90%, 50-70%, 70-90%, greater than 50%, greater than 70%, greater 90%, less than 50%, less than 70%, and/or less than 90% of a lateral span of the respective upper wing panel.

When the centroids associated with the acreages of the upper wing panels are extended through the upper joint assembly, the centroids may not directly coincide with each other, or meet, at the mating plane 48, for example, due to the outboard upper wing panel being configured differently than the center upper wing panel, as schematically represented in FIG. 3 with the centroid 56 associated with the acreage of the center upper wing panel 28 crossing the mating plane above the centroid 54 associated with the acreage of the outboard upper wing panel 24. Additionally or alternatively, the centroids associated with the acreages of the upper wing panels, or extensions of these centroids, may be described as intersecting the mating plane at different heights, or locations, such as with an extension of the centroid of the compressive outward pressure 52 intersecting the mating plane above an extension of the compressive inward pressure 50.

In such embodiments of upper joints 36, the upper joint 36 may be configured to shift and/or direct the centroids of the compressive inward pressure 50 and the compressive outward pressure 52 so that they more closely react in position to each other at the mating plane 48. This optional functionality and configuration of an upper joint is schematically represented in FIG. 3 with the centroid 56 associated with the compressive outward pressure 52 having been shifted downward to coincide with and/or meet the centroid 54 associated with the compressive inward pressure 50 at the mating plane. In some embodiments, the centroids of the compressive inward pressure and the compressive outward pressure may at least approximately coincide and/or meet at the mating plane. Additionally or alternatively, in some embodiments, the centroids of the compressive inward pressure and the compressive outward pressure may substantially and/or fully meet at the mating plane. Additionally or alternatively, an upper joint 36 may be configured to generally direct the centroids toward each other, so as to balance the upper joint in such a manner that unwanted torques are not applied to the upper joint assembly 38, or at least that substantial torques are not applied to the upper joint assembly as a result of the compressive pressures applied by the upper wing panels.

In such embodiments of wing assemblies, it is desirable to configure the upper joint 36 so that the centroids 54, 56 come together and are aligned, or at least approximately aligned, at the mating plane 48, so as to avoid a discontinuity of the compressive pressures within the upper joint. This is schematically illustrated in FIG. 3 with the centroid 56 associated with the compressive outward pressure 52 having been shifted downward within the vicinity of the upper joint 36. This downward shift in the centroid 56 may be accomplished in various ways, such as due to the configuration of the upper joint assembly 38 and its component parts, as well as due to the operative attachment between the upper joint assembly and the upper wing panels. For example, the strategic use of fasteners between the upper joint assembly and the upper wing panels may facilitate a shift in the centroids associated with the compressive pressures. As a more specific example, fasteners used to couple together the vertical flange 47 of a center upper stringer 44 and the vertical web of an inboard compression fitting 68 may facilitate a load transfer between these components, thereby allowing for a shift in the centroid associated with the center upper wing panel.

Additionally or alternatively, the configuration of one or more of the center upper stringers 44 and/or the center upper skin 46 may be altered from within the acreage of the center upper wing panel 28 to within the vicinity of the upper joint 36. For example, as schematically represented in dashed lines in FIG. 3, the center upper skin 46 may be thicker within the vicinity of the upper joint compared to within the acreage of the center upper wing panel, optionally with a thickness that increases as it approaches the mating plane.

Additionally or alternatively, as also schematically represented in dashed lines in FIG. 3, the horizontal flange or flanges 45 associated with one or more of the center upper stringers 44 may be thicker within the vicinity of the upper joint compared to the within the acreage of the center upper wing panel, optionally with a thickness that increases as it approaches the mating plane. Additionally or alternatively, as also schematically represented in dashed lines in FIG. 3, the vertical flange or flanges 47 associated with one or more of the center upper stringers 44 may be smaller, or shorter, within the vicinity of the upper joint compared to within the acreage of the center upper wing panel, optionally with a height than decreases as it approaches the mating plane.

While the discussion above primarily relates to the downward shift of the centroid 56 associated with the compressive outward pressure 52, the centroid 54 associated with the compressive inward pressure 50 similarly may be shifted upward so that the centroids coincide with each other at the mating plane. Moreover, it also is within the scope of the present disclosure that a wing assembly may be configured such that an extension of the centroid 56 associated with the compressive outward pressure across the acreage of the center upper wing panel intersects the mating plane below an extension of the centroid 54 associated with the compressive inward pressure across the acreage of the outboard upper wing panel. In such optional embodiments, similar to the schematic example of FIG. 3 discussed in detail herein, an upper joint may be configured to shift the centroids within the vicinity of the upper joint so that they coincide, or at least approximately coincide, at the mating plane defined by the upper joint assembly. Factors that may affect whether a centroid is shifted upward or downward in the vicinity of the upper joint include the material selection for the construction of the upper wing panels. For example, the schematically illustrated example in FIG. 3 with an extension of the centroid 56 across the acreage of the center upper wing panel intersecting the mating plane above an extension of the centroid 54 across the acreage of the outboard upper wing panel may be associated with a wing assembly in which the center upper wing panel is constructed of a metal, such as aluminum, and the outboard upper wing panel is constructed of a CFRP.

In addition to, or as an alternative to, configuring the upper joint assembly 38 and/or having an upper wing panel configured differently within the vicinity of the upper joint than within the acreage of the upper wing panel to shift one or both of the pressure centroids so that they meet at the mating plane 48, it also may be desirable to space the outboard upper stringers 40 differently than the center upper stringers 44 along the fore/aft direction of the upper joint 36. Such a configuration may be desirable, for example, in embodiments of upper joints in which the outboard upper wing panel 24 and the center upper wing panel 28 are constructed of different materials. FIG. 5 schematically illustrates in plan view, that in some embodiments of upper joints, at least a subset of the center upper stringers do not directly oppose corresponding outboard upper stringers at the upper joint assembly 38. In some such embodiments, for at least a substantial fore/aft span of the upper joint, every second of the center upper stringers is directly opposed to a corresponding outboard upper stringer, and every other second of the center upper stringers is not directly opposed to a corresponding outboard upper stringer. In other words, for at least a substantial fore/aft span of the upper joint, only every other one of the center upper stringers is directly opposed to a corresponding outboard upper stringer. Additionally or alternatively, in some embodiments, for at least a substantial fore/aft span of the upper joint, twice as many, or at least approximately twice as many, center upper stringers may be present than outboard upper stringers.

As used herein, a substantial fore/aft span of the upper joint refers to a fore/aft span that encompasses at least 3, 5, 7, 9, 11, 13, 15, 17, 19, or 21 outboard upper stringers, and/or that spans at least 10%, 20%, 30%, 40%, 50%, 60%, 70%, 80%, or 90% of a total fore/aft span of the upper joint. In some embodiments, although not required, a portion of the fore/aft span of the upper joint may be configured differently than as expressly disclosed and illustrated herein, such as to include and/or accommodate such optional functionality as passing fluids between an outboard wing box and the wing center section. For example, in such situations, specifically configured stringers and corresponding fittings may be used to facilitate operative transport of such fluids as fuel, hydraulic fluid, etc.

In some embodiments of upper joints 36, although not required in all embodiments, for at least a substantial fore/aft span of the upper joint, a first subset of the center upper stringers 44 may be operatively and/or directly coupled to the upper joint assembly 38, and a second subset of the center upper stringers may not be operatively and/or directly coupled to the upper joint assembly. Stated differently, the second subset of the center upper stringers may terminate without being coupled directly to the joint assembly, as schematically illustrated in FIG. 5. In some such embodiments, the center upper stringers of this second subset may correspond to the optional center upper stringers that do not coincide with and/or that do not directly oppose corresponding outboard upper stringers 40, such as schematically represented in FIG. 5. By optionally terminating a center upper stringer 44 without being coupled directly to the upper joint assembly 38, the centroid 56 of the compressive outward pressure 52 associated with the center upper wing panel 28 may better react, or coincide with, the centroid 54 of the compressive inward pressure 50 associated with the outboard upper wing panel 24. Having a subset of the center upper stringers terminate without being coupled directly to the upper joint assembly and/or without directly applying a pressure against the upper joint assembly without a corresponding outboard upper stringer directly opposing such pressure, may facilitate a localized upward shift of the centroid 56 within the vicinity of the upper stringers that terminate without being coupled directly to the upper joint assembly; however, the centroid 56 associated with the center upper wing panel 28, as a whole, may shift downward within the vicinity of the upper joint assembly 38.

Additionally or alternatively, in some embodiments of upper joints 36, for at least a substantial fore/aft span of the upper joint, a first subset of the center upper stringers 44 may be operatively coupled to the lower flange 64 of upper joint assembly 38 via an inboard compression fitting 68, and a second subset of the center upper stringers may not be operatively coupled to the lower flange 64 via an inboard compression fitting 68. Stated differently, the second subset of the center upper stringers may terminate without an inboard compression fitting directing the compressive outward pressure 52 directly across from the compressive inward pressure 50. In some such embodiments, the center upper stringers of this second subset may correspond to the optional center upper stringers that do not coincide with and/or that do not directly oppose corresponding outboard upper stringers 40, such as schematically represented in FIG. 5 without an optional inboard compression fitting 68 schematically overlapping this second subset of center upper stringers. By optionally terminating a center upper stringer 44 without utilizing an inboard compression fitting between such a center upper stringer and the lower flange of the upper joint assembly 38, the centroid 56 of the compressive outward pressure 52 associated with the center upper wing panel 28 may better react, or coincide with, the centroid 54 of the compressive inward pressure 50 associated with the outboard upper wing panel 24. Similar to above, having a subset of the center upper stringers terminate without being coupled directly to the upper joint assembly, and/or without directly applying a pressure against the upper joint assembly without a corresponding outboard upper stringer directly opposing such pressure, may facilitate a localized upward shift of the centroid 56 within the vicinity of the upper stringers that terminate without being coupled to an inboard compression fitting; however, the centroid 56 associated with the center upper wing panel 28, as a whole, may shift downward within the vicinity of the upper joint assembly 38.

Alternatively, rather than incorporating more (e.g., twice as many) center upper stringers 44 than outboard upper stringers 40 for a substantial fore/aft span of an upper joint 36, it also is within the scope of the present disclosure that an upper joint may include an equal number of center upper stringers and outboard upper stringers for a substantial fore/aft span of the upper joint, as schematically illustrated in FIG. 6. As an illustrative, non-exclusive example, the center upper stringers may be configured as hat-shaped stringers, or other suitably configured stringers, that effectively are configured to provide twice, or at least approximately twice, the stiffness of alternative stringers, such as blade stringers, Z-stringers, I-stringers, and the like. In FIG. 6, these optional center upper stringers are schematically illustrated as having a fore/aft width that is significantly greater than the corresponding outboard upper stringers 40 directly opposite the upper joint assembly 38.

Turning now to FIG. 7, illustrative, non-exclusive examples of upper joint assemblies 38 are schematically illustrated in profile and corresponding to where an outboard upper stringer 40 is directly opposite a center upper stringer 44. As schematically illustrated, an upper joint assembly 38 may include an outboard flange 60 that is operatively coupled to the outboard upper wing panel 24, an inboard flange 62 that is operatively coupled to the center upper wing panel 28, a lower flange 64 that is operatively coupled to the rib 32, a plurality of outboard compression fittings 66 that are operatively coupled between the outboard upper wing panel and the lower flange, and a plurality of inboard compression fittings 68 that are operatively coupled between the center upper wing panel and the lower flange. Accordingly, the outboard flange, the inboard flange, and the lower flange may be described as defining a T-shape in profile, with the angle between the outboard flange and the inboard flange defining the dihedral angle between the outboard wing box and the wing center section.

In some embodiments, the upper joint assembly 38 may include a splice plate 70 that defines the outboard flange 60 and the inboard flange 62, and a lower T-fitting 72 that defines the lower flange 64, with the lower T-fitting being operatively coupled to the underside of the splice plate. In some embodiments, the upper joint assembly additionally may include an upper T-fitting 74 that is operatively coupled to the upper side of the splice plate opposite the lower T-fitting, with the upper T-fitting providing an interface for operative coupling to adjacent structure of an aircraft.

The outboard compression fittings 66 and the inboard compression fittings 68 are described as compression fittings, because they are specifically configured for use in a compression joint, such as an upper joint 36. That is, the compression fittings of an upper joint 36 are configured to translate the compressive inward pressure 50 and the compressive outward pressure 52 so that they directly oppose each other across the lower flange 64 of the upper joint assembly 38. Illustrative, non-exclusive examples of compression fittings that may be used in upper joint assemblies include (but are not limited to) bathtub fittings, half-bathtub fittings, and paddle fittings, for example depending on the configuration of a respective stringer or stringers of the outboard upper stringers and the center upper stringers.

In FIG. 7, the outboard compression fittings 66 are schematically represented in an overlapping relationship with the outboard upper wing panel 24, including both the outboard upper skin 42 and the outboard upper stringers 40, schematically representing that the outboard compression fittings may operatively engage and/or be operatively coupled to one or both of the outboard upper skin and the outboard upper stringers. Similarly, the inboard compression fittings 68 are schematically represented in an overlapping relationship with the center upper wing panel 28, including both the center upper skin 46 and the center upper stringers 44, schematically representing that the inboard compression fittings may operatively engage and/or be operatively coupled to one or both of the center upper skin and the center upper stringers.

In some embodiments, each of the inboard compression fittings 68 may be operatively coupled to the center upper skin 46, the lower flange 64, and to two adjacent center upper stringers 44.

In some embodiments, a subset of the center upper stringers 44 may not be coupled directly to an inboard compression fitting 68, for example, as schematically and optionally illustrated in FIG. 5 in connection with an optional embodiment in which a subset of the center upper stringers terminate without an inboard compression fitting between a center upper stringer and the lower flange of the upper joint assembly 38. In some such embodiments, as also represented optionally in FIG. 5, every second of the plurality of center upper stringers 44 may not be coupled directly to an inboard compression fitting 68, at least for a substantial fore/aft span of the upper joint.

In some embodiments, such as schematically represented in FIGS. 5 and 7, the plurality of inboard compression fittings 68 may be coupled to the lower flange 64 directly across from an outboard compression fitting 66 for at least a substantial fore/aft span of the upper joint.

In some embodiments, the upper joint 36 may include a plurality of fasteners 76 that operatively couple together two or more components of the upper joint. For example, fasteners may be used to operatively couple together the center upper wing panel 28 to the inboard flange 62, to operatively couple together the outboard upper wing panel 24 to the outboard flange 60, to operatively couple together the center upper stringers 44 to the center upper skin 46, to operatively couple together the outboard upper stringers 40 to the outboard upper skin 42, to operatively couple together the inboard compression fittings 68 to the lower flange 64, and/or to operatively couple together the outboard compression fittings 66 to the lower flange 64. Additionally or alternatively, various components may be operatively coupled together by other mechanisms, such as with adhesive, or by other processes, such as curing of composite materials.

In some embodiments, such as schematically illustrated in FIG. 7, one or more fasteners 76 may extend vertically through and couple together the inboard flange 62, the center upper skin 46, a horizontal flange 45 of a center upper stringer 44, and a horizontal flange 69 of an inboard compression fitting 68. Additionally or alternatively, as also schematically illustrated in FIG. 7, one or more fasteners 76 may extend horizontally through a vertical web or webs of an inboard compression fitting 68 and the vertical flange 47 of a center upper stringer 44. Such optional fasteners 76 may facilitate the downward shift of the centroid associated with the compressive outward pressure across the center upper wing panel within the vicinity of the upper joint. Additionally or alternatively, the inclusion of such optional fasteners in some embodiments may split a load line associated with a center upper stringer 44 into two loads lines, with a first load line shifting upward to the fastened interface between the inboard flange 62, the center upper skin 46, the horizontal flange 45 of the center upper stringer 44, and the horizontal flange 69 of the inboard compression fitting 68, and with a second load line shifting to the fastened interface between the vertical web or webs of the inboard compression fitting 68 and the vertical flange 47 of the center upper stringer 44. The resultant centroid of these split load lines may coincide with, or at least approximately coincide with the opposing centroid associated with the compressive inward pressure associated with the outboard upper wing panel.

In some embodiments, such as schematically illustrated in FIG. 7, fasteners 76 also may directly couple outboard compression fittings 66 and inboard compression fittings 68 directly across from each other and to the lower flange 64. In other words, a single fastener operatively may couple an outboard compression fitting and an inboard compression fitting to the lower flange, with the fasteners extending through all three of the outboard compression fitting, the lower flange, and the inboard compression fitting. Additionally or alternatively, in some embodiments, an outboard compression fitting may be coupled to the lower flange directly across from two inboard compression fittings, with FIG. 6 schematically and optionally illustrating such an example with two inboard compression fittings 68 associated with each of the illustrated center upper stringers 44 and with a single outboard compression fitting 66 associated with each of the illustrated outboard upper stringers 40. Other configurations also are within the scope of the present disclosure.

Figure 12:
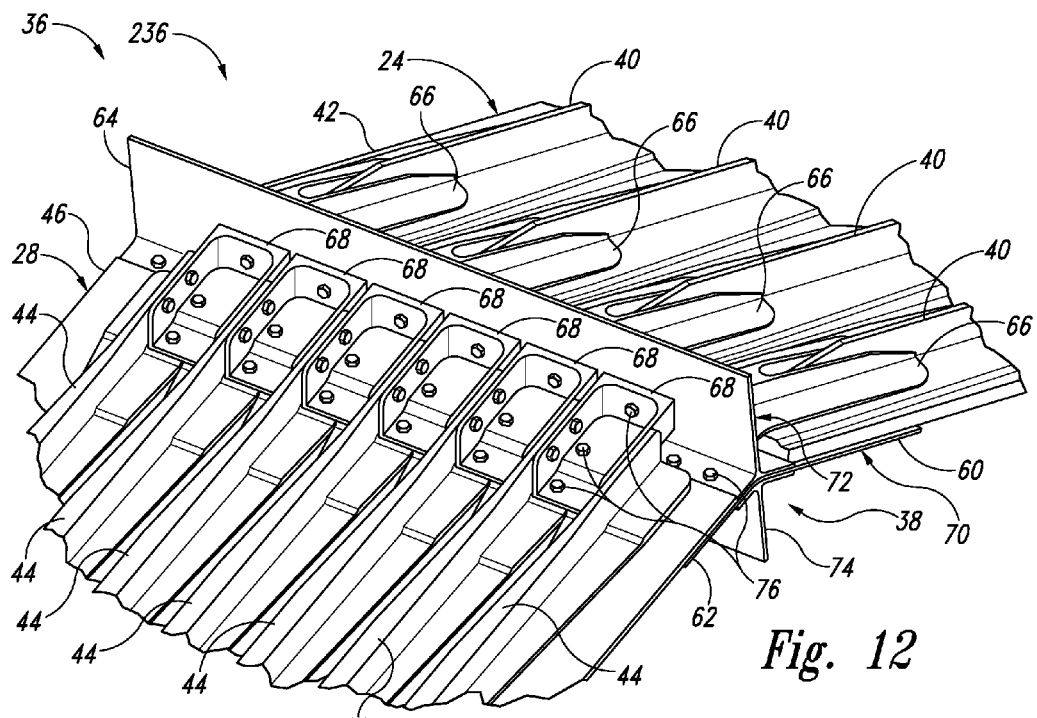
FIG. 12 is a fragmentary isometric bottom view of another illustrative, non-exclusive example of an upper joint according to the present disclosure.
Figure 13:
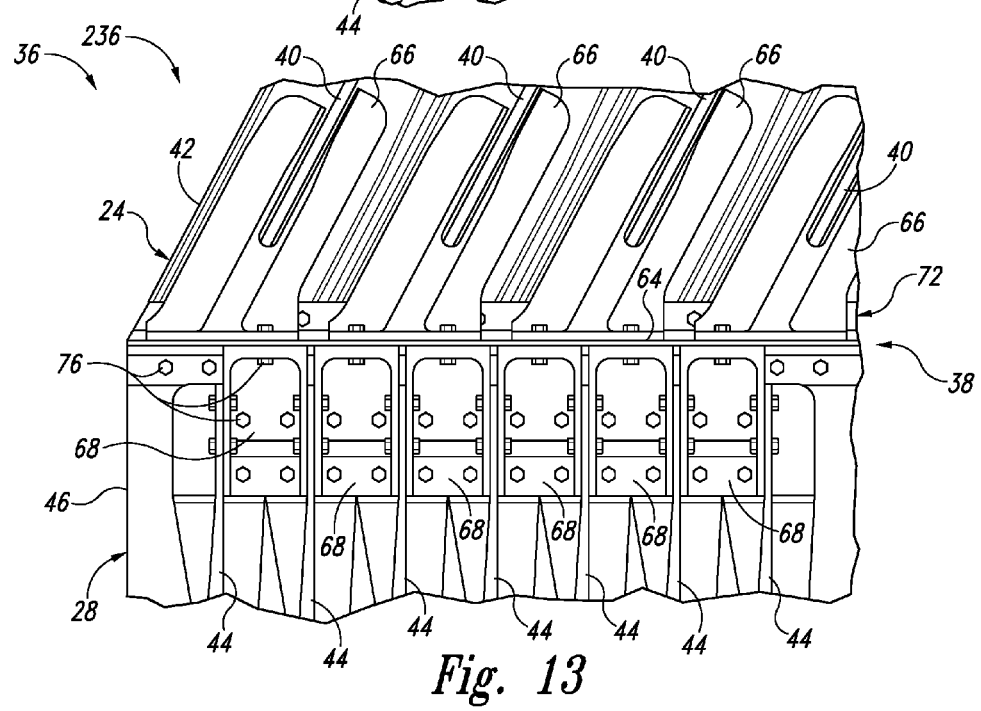
FIG. 13 is a fragmentary bottom view of the upper joint of FIG. 12.
Figure 14:
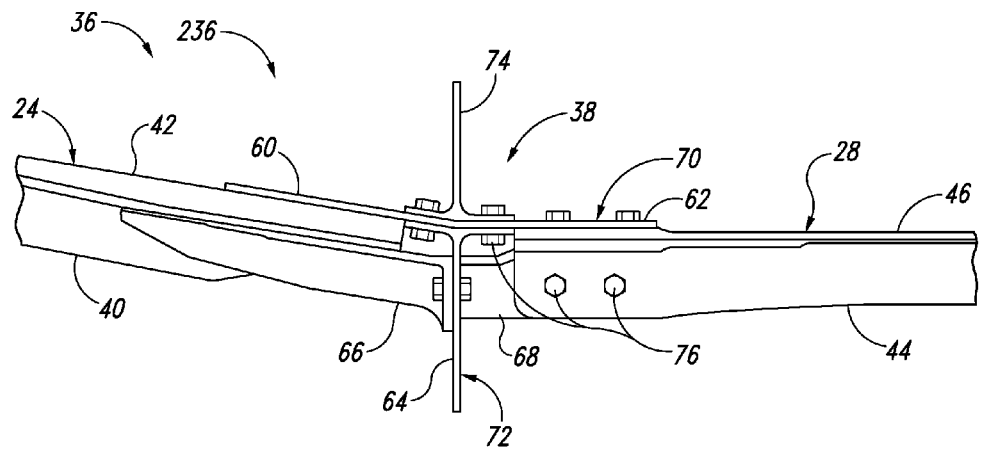
FIG. 14 is a fragmentary side view of the upper joint of FIG. 12.
Figure 15:
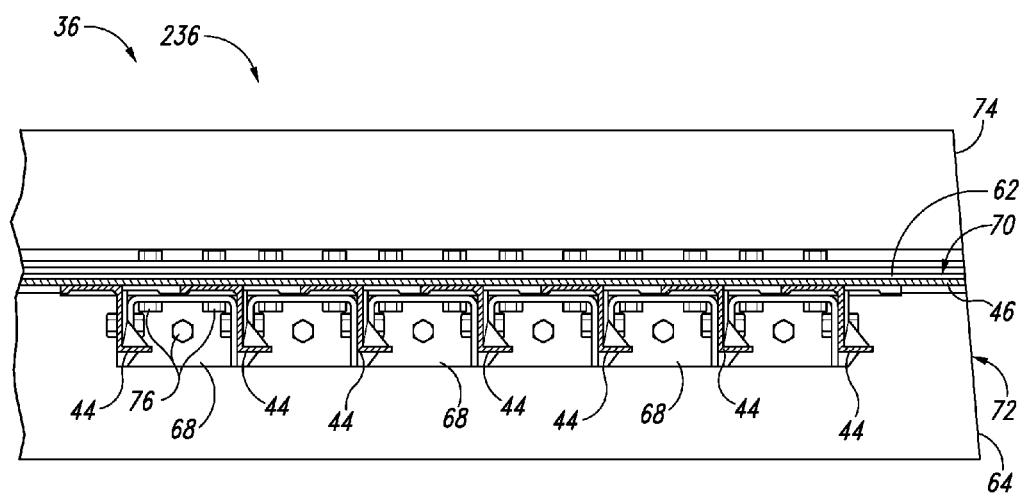
FIG. 15 is a fragmentary cross-sectional view of the upper joint of FIG. 12.
Figure 16:
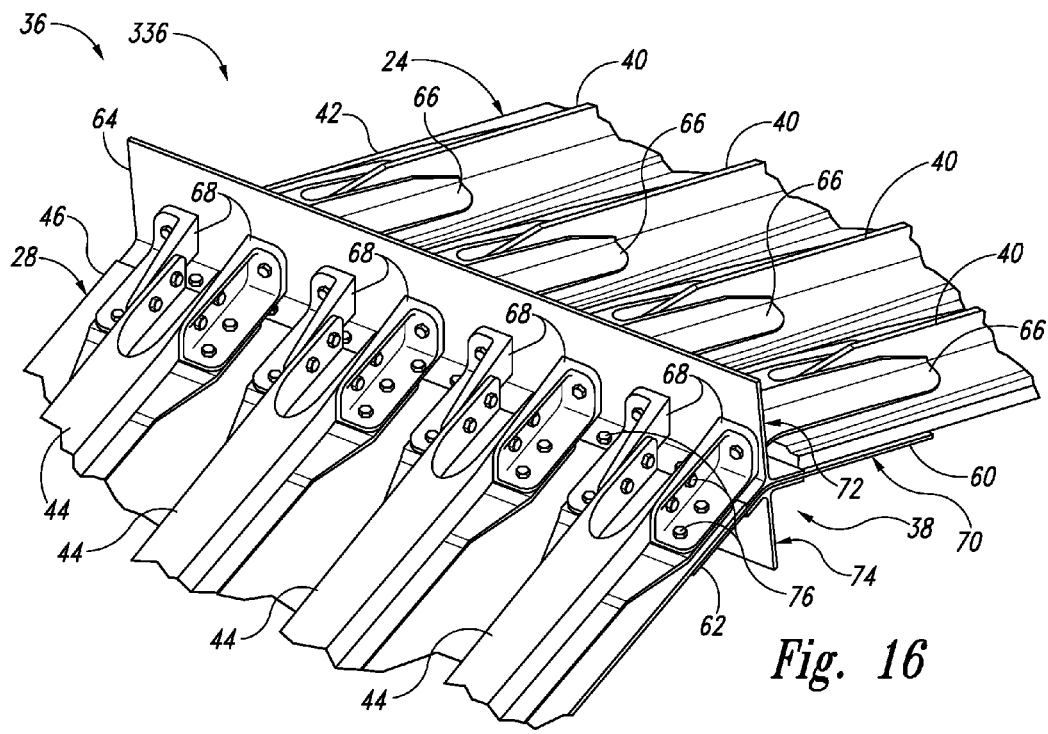
FIG. 16 is a fragmentary isometric bottom view of another illustrative, non-exclusive example of an upper joint according to the present disclosure.
Figure 17:
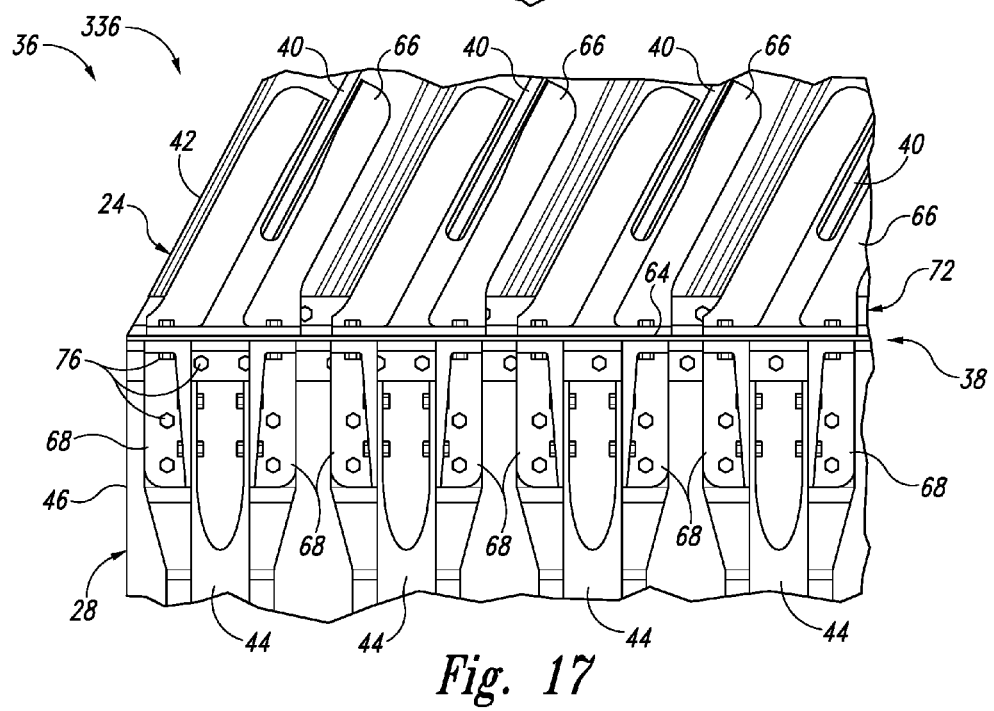
FIG. 17 is a fragmentary bottom view of the upper joint of FIG. 16.
Figure 18:
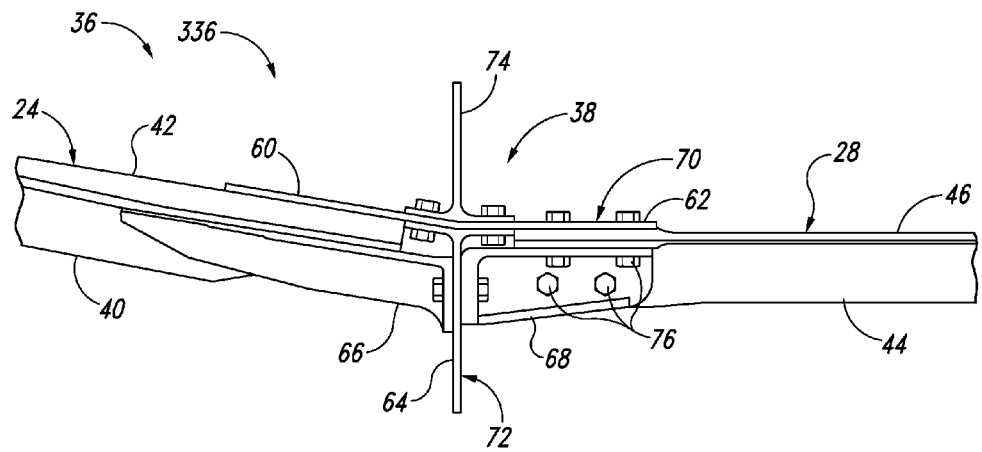
FIG. 18 is a fragmentary side view of the upper joint of FIG. 16.
Figure 19:
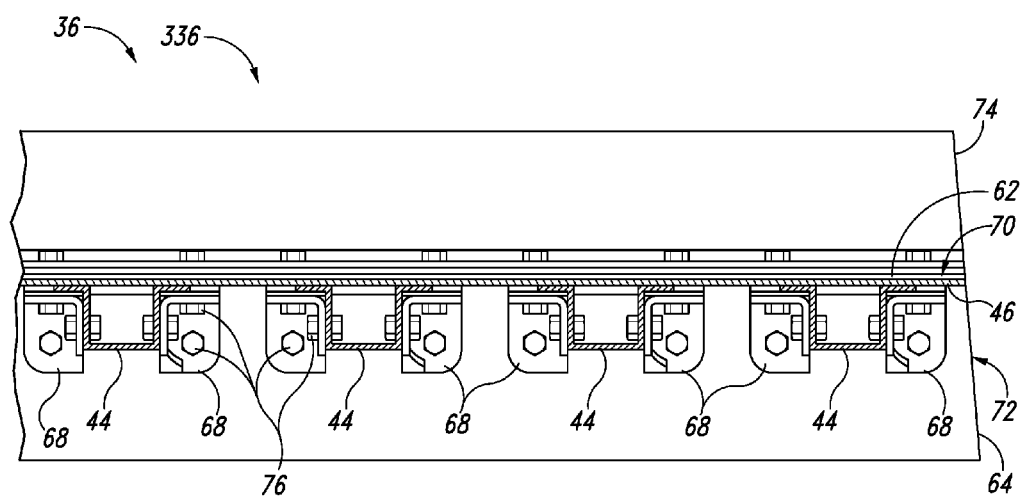
FIG. 19 is a fragmentary cross-sectional view of the upper joint of FIG. 16.
Figure 20:
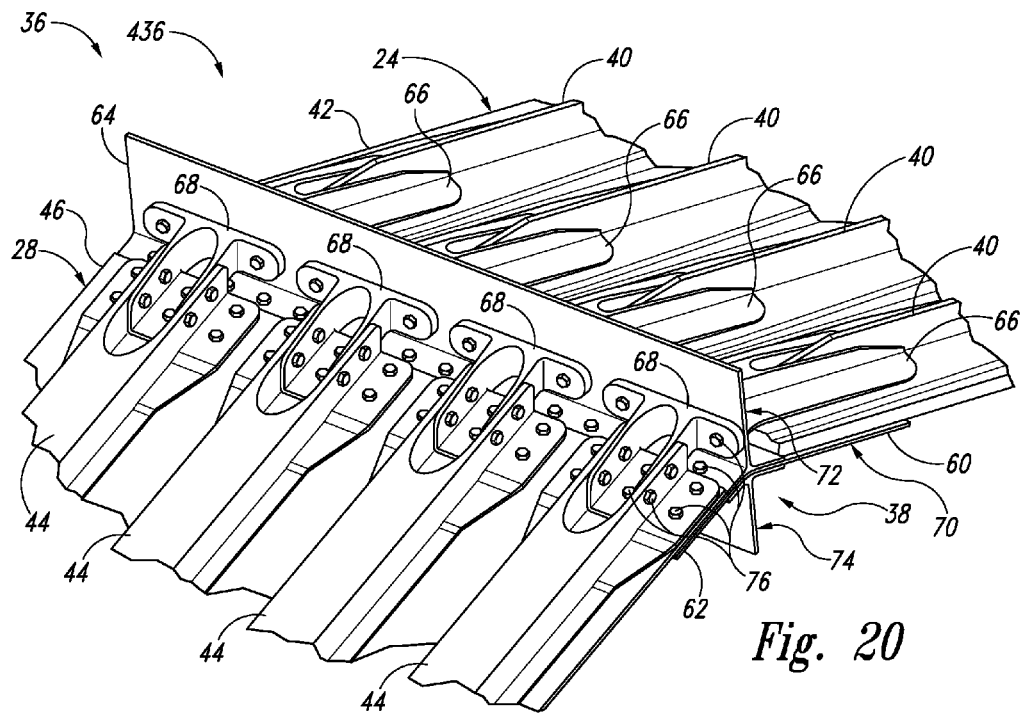
FIG. 20 is a fragmentary isometric bottom view of another illustrative, non-exclusive example of an upper joint according to the present disclosure.
Figure 21:
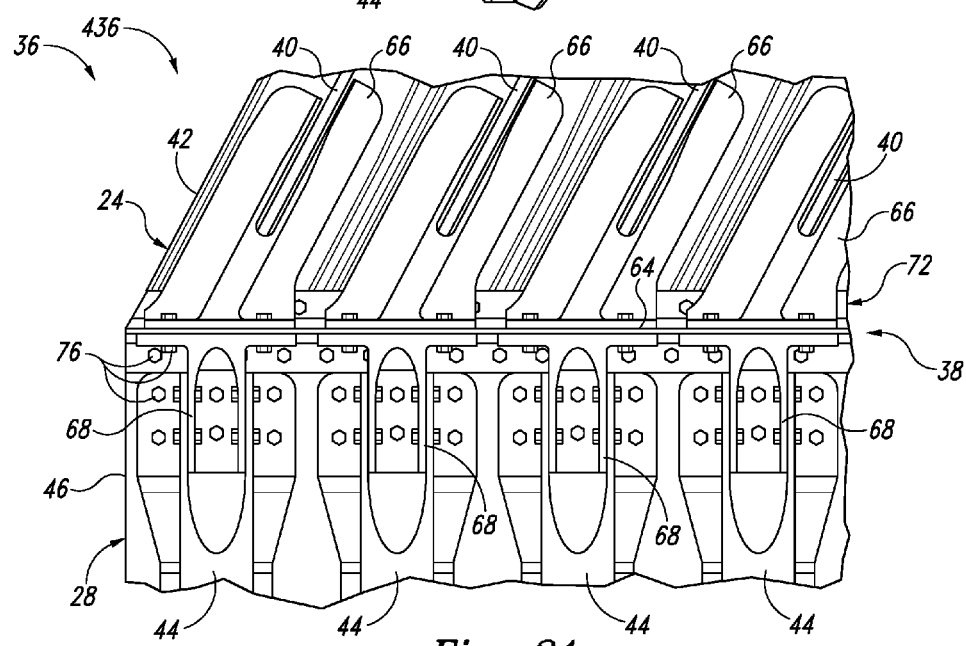
FIG. 21 is a fragmentary bottom view of the upper joint of FIG. 20.
Figure 22:
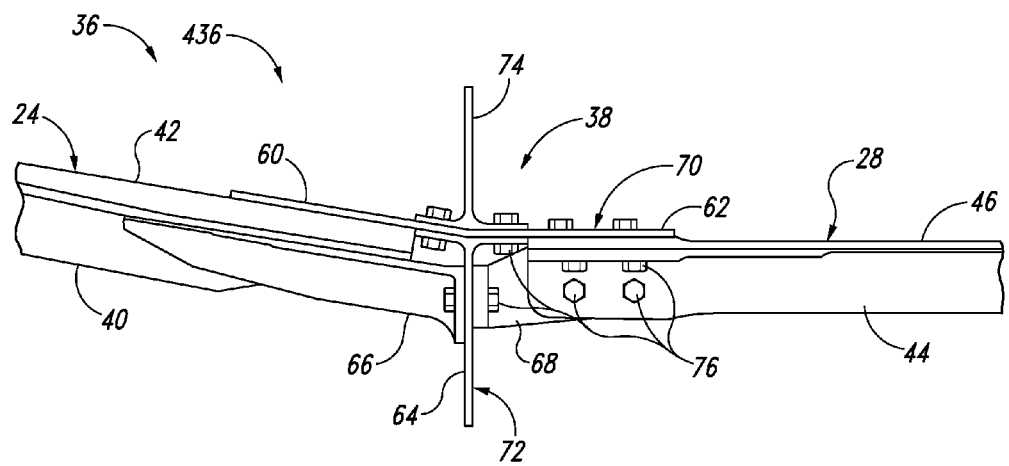
FIG. 22 is a fragmentary side view of the upper joint of FIG. 20.
Figure 23:
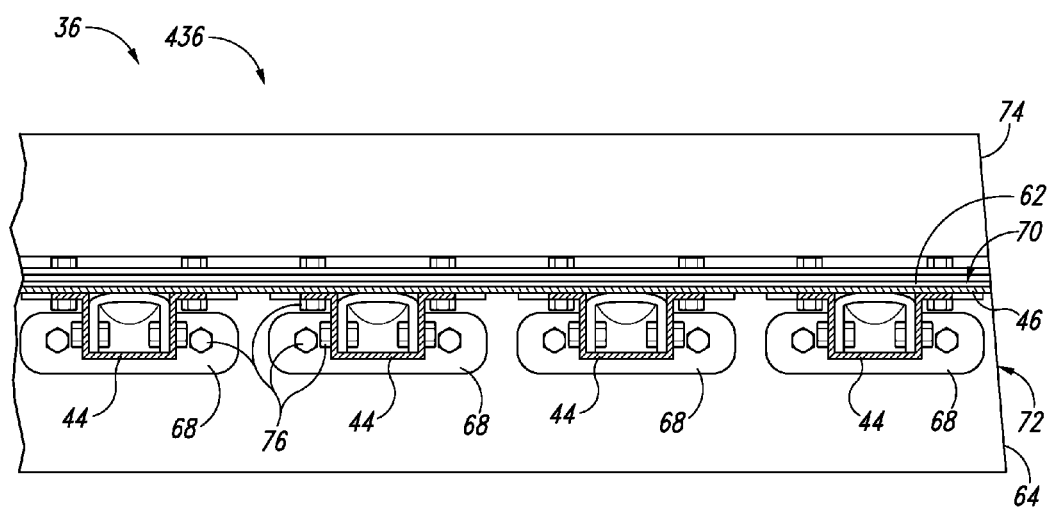
FIG. 23 is a fragmentary cross-sectional view of the upper joint of FIG. 20.

Turning now to FIGS. 8-22, illustrative non-exclusive examples of upper joints 36 are illustrated. Where appropriate, the reference numerals from the schematic illustrations of FIGS. 2-7 are used to designate corresponding parts of the upper joints of FIGS. 8-22; however, the examples of FIGS. 8-22 are non-exclusive and do not limit upper joints 36 and components thereof to the illustrated embodiments of FIGS. 8-22. That is, upper joints 36, and thus wing assemblies 12 and aircraft 10, are not limited to the specific embodiments of the illustrated upper joints of FIGS. 8-22, and upper joints 36, wing assemblies 12, and aircraft 10 may incorporate any number of the various aspects, configurations, characteristics, properties, etc. of upper joints 36 that are illustrated in and discussed with reference to the schematic representations of FIGS. 2-7 and/or the embodiments of FIGS. 8-22, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the upper joints of FIGS. 8-22; however, it is within the scope of the present disclosure that the previously discussed features, variants, etc. may be utilized with such lower joints. Moreover, the depictions of the upper joints of FIGS. 8-22 are constructed to best show the various component parts of the example embodiments over a limited fore/aft span of an upper joint, and therefore do not necessarily show each and every component that may be present in a particular view of an upper joint. With reference to FIG. 12 as an example, the right-most and left-most center upper stringers 44 are illustrated with an inboard compression fitting 68 on only a single side of the respective center upper stringer and without an adjacent center upper stringer; however, in construction of an associated embodiment, such additional inboard compression fittings and center upper stringers may be present.

As seen with reference to FIGS. 8-11, a first upper joint 136 is an example of an upper joint 36 that includes a stiffened outboard upper wing panel 24 constructed substantially of a CFRP, a stiffened center upper wing panel 28 constructed substantially of an aluminum alloy, and an upper joint assembly 38. The upper joint assembly includes an upper T-fitting 74 constructed of an aluminum alloy, a splice plate 70 constructed of a titanium alloy, a lower T-fitting 72 constructed of a titanium alloy, a plurality of outboard compression fittings 66 constructed of a titanium alloy, and a plurality of inboard compression fittings 68 constructed of an aluminum alloy. The stiffened outboard upper wing panel includes a plurality of outboard upper stringers 40 that may be described as blade stringers and/or as having generally T-shaped cross-sectional profiles. The stiffened center upper wing panel, however, includes a plurality of center upper stringers 44 that may be described as Z-stringers and/or as having a generally Z-shaped cross-sectional profile for a substantial length of the stringers.

Upper joint 136 is an example of an upper joint 36 in which every second of the center upper stringers 44 is directly opposed to a corresponding outboard upper stringer 40, and every other second of the center upper stringers is not directly opposed to a corresponding outboard upper stringer. Moreover, upper joint 136 is an example of an upper joint 36 in which every second of the center upper stringers terminates without an inboard compression fitting 68 coupled between every other center upper stringer 44 and the lower flange 64.

Figure 8:
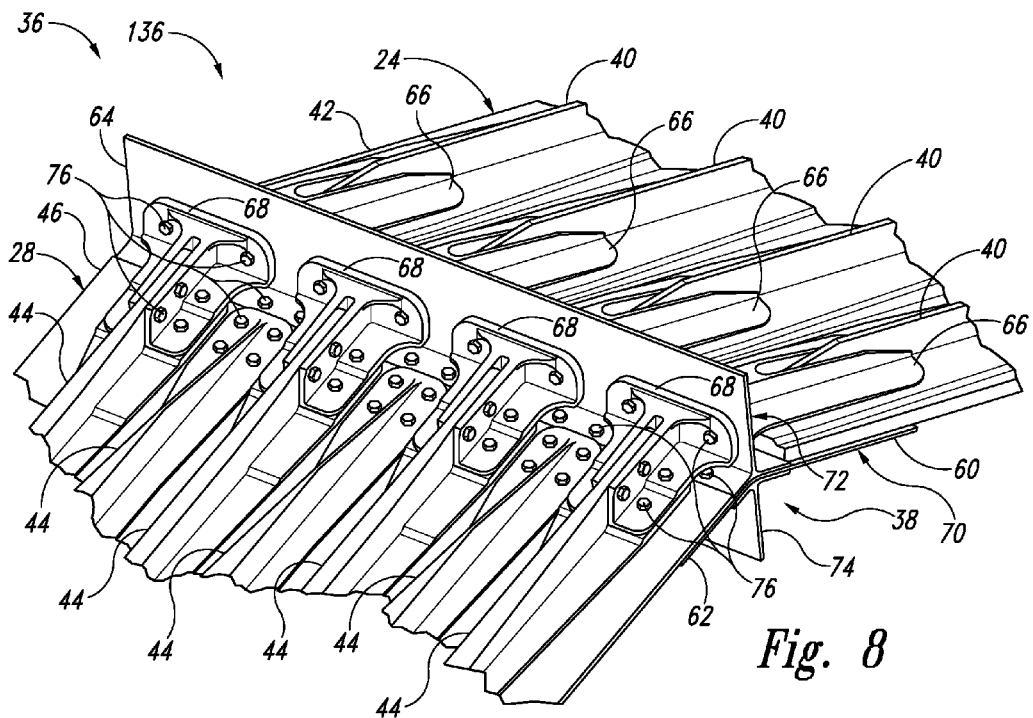
FIG. 8 is a fragmentary isometric bottom view of an illustrative, non-exclusive example of an upper joint according to the present disclosure.
Figure 9:
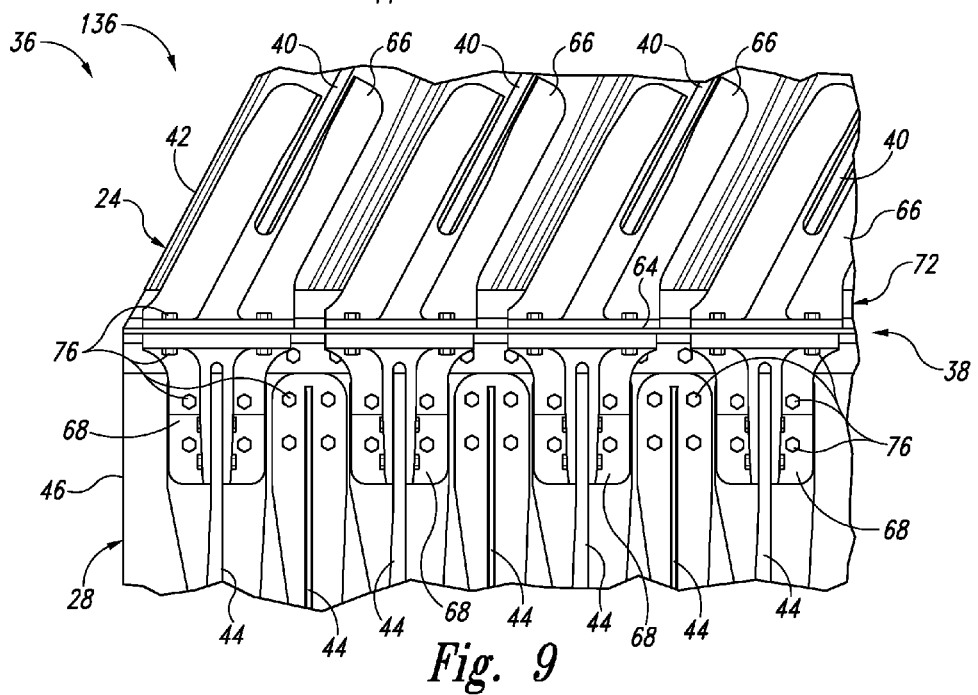
FIG. 9 is a fragmentary bottom view of the upper joint of FIG. 8.
Figure 10:
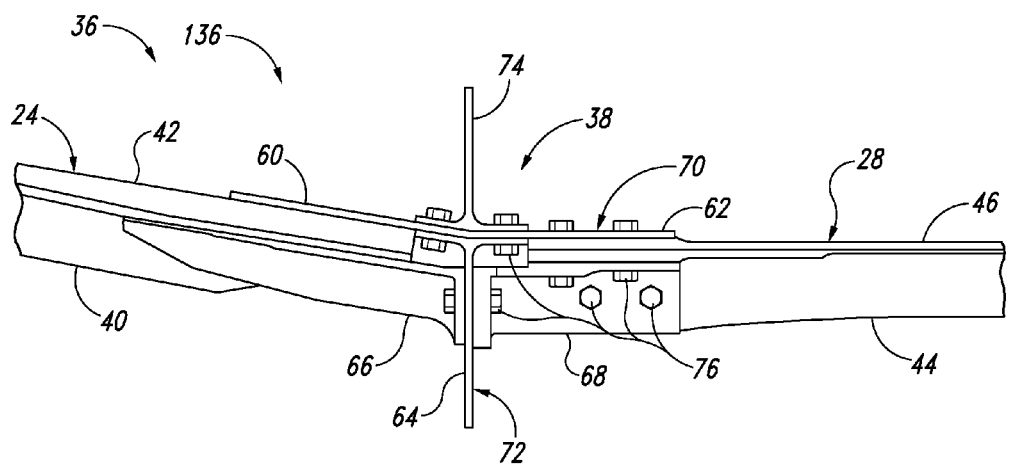
FIG. 10 is a fragmentary side view of the upper joint of FIG. 8.
Figure 11:
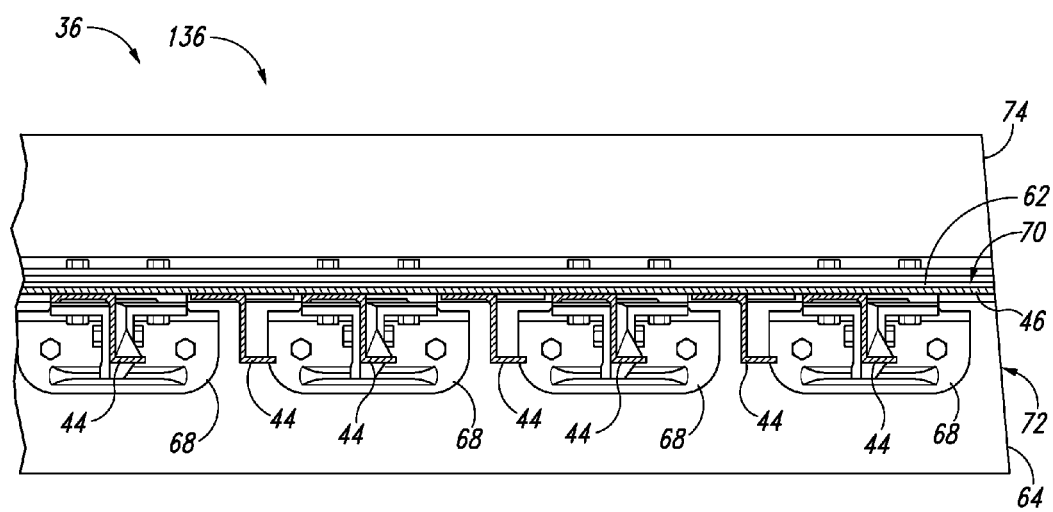
FIG. 11 is a fragmentary cross-sectional view of the upper joint of FIG. 8.

As perhaps best seen in FIG. 8, each center upper stringer of the subset of the center upper stringers 44 that terminates without an inboard compression fitting 68 tapers from a Z-shaped cross-sectional profile to a tapering T-shaped cross-sectional profile, ultimately having only a flanged base without a vertical web at its ultimate terminus adjacent to the lower T-fitting 72. Moreover, as perhaps best seen in FIG. 11, this subset of the center upper stringers are generally smaller than the remaining center upper stringers that are coupled directly to the lower flange 64 of the lower T-fitting 72 via an inboard compression fitting.

Upper joint 136 is an example of an upper joint 36 in which a plurality of fasteners 76 are utilized to operatively couple the center upper wing panel 28 to the upper joint assembly 38 and to operatively couple the inboard compression fittings 68 directly across from corresponding outboard compression fittings 66. Moreover, the use of vertical fasteners to couple directly together the inboard flange 62, the center upper skin 46, the horizontal flanges of the center upper stringers 44, and the horizontal flanges of the inboard compression fitting 68, as well as the use of horizontal fasteners to couple directly together the vertical webs of the inboard compression fittings 68 and the vertical flanges of the center upper stringers 44, facilitates a desired downward shift in the centroid associated with the compressive outward pressure applied across the center upper wing panel during flight of an aircraft.

Turning now to FIGS. 12-15, a second upper joint 236 is an example of an upper joint 36 that similarly includes a stiffened outboard upper wing panel 24 constructed substantially of a CFRP, a stiffened center upper wing panel 28 constructed substantially of an aluminum alloy, and an upper joint assembly 38. The upper joint assembly includes an upper T-fitting 74 constructed of an aluminum alloy, a splice plate 70 constructed of a titanium alloy, a lower T-fitting 72 constructed of a titanium alloy, a plurality of outboard compression fittings 66 constructed of a titanium alloy, and a plurality of inboard compression fittings 68 constructed of an aluminum alloy. Like upper joint 136 of FIGS. 8-11, the stiffened outboard upper wing panel of upper joint 236 includes a plurality of outboard upper stringers 40 that may be described as blade stringers and/or as having generally T-shaped cross-sectional profiles. Also like upper joint 136, the stiffened center upper wing panel of upper joint 236 includes a plurality of center upper stringers 44 that may be described as Z-stringers and/or as having a generally Z-shaped cross-sectional profile for a substantial length of the stringers.

Also similar to upper joint 136, upper joint 236 is an example of an upper joint 36 in which every second of the center upper stringers 44 is directly opposed to a corresponding outboard upper stringer 40, and every other second of the center upper stringers is not directly opposed to a corresponding outboard upper stringer. However, unlike upper joint 136, upper joint 236 is an example of an upper joint 36 in which inboard compression fittings 68 are coupled directly between the lower flange 64 and each of the center upper stringers. More specifically, each of the inboard compression fittings may be described as a bathtub fitting and is coupled to an adjacent pair of the center upper stringers.

Upper joint 236 is another example of an upper joint 36 in which a plurality of fasteners 76 are utilized to operatively couple the center upper wing panel 28 to the upper joint assembly 38 and to operatively couple the inboard compression fittings 68 directly across from corresponding outboard compression fittings 66. Moreover, vertical fasteners are utilized to couple directly together the inboard flange 62, the center upper skin 46, the horizontal flanges of the center upper stringers 44, and the horizontal flanges of the inboard compression fittings 68, and horizontal fasteners are utilized to couple directly together the vertical webs of the inboard compression fittings 68 and the vertical flanges of the center upper stringers 44. These fasteners facilitate a desired downward shift in the centroid associated with the compressive outward pressure within the vicinity of the upper joint during flight of an aircraft.

FIGS. 16-19 show a third upper joint 336, which is another example of an upper joint 36 that includes a stiffened outboard upper wing panel 24 constructed substantially of a CFRP, a stiffened center upper wing panel 28 constructed substantially of an aluminum alloy, and an upper joint assembly 38. The upper joint assembly includes an upper T-fitting 74 constructed of an aluminum alloy, a splice plate 70 constructed of a titanium alloy, a lower T-fitting 72 constructed of a titanium alloy, a plurality of outboard compression fittings 66 constructed of a titanium alloy, and a plurality of inboard compression fittings 68 constructed of an aluminum alloy. Like upper joint 136 and upper joint 236, the stiffened outboard upper wing panel of upper joint 336 includes a plurality of outboard upper stringers 40 that may be described as blade stringers and/or as having generally T-shaped cross-sectional profiles. However, unlike upper joint 136 and upper joint 236, the stiffened center upper wing panel 28 of upper joint 336 includes a plurality of center upper stringers 44 that may be described as hat-shaped stringers.

Unlike upper joint 136 and upper joint 236, upper joint 336 is an example of an upper joint 36 in which each of the center upper stringers 44 is directly opposed to a corresponding outboard upper stringer 40. Moreover, upper joint 336 is an example of an upper joint 36 in which the inboard compression fittings 68 take the form of half-bathtub fittings with two such fittings operatively coupled between the hat-shaped stringers and the lower flange 64 of the upper joint assembly 38, and with each half-bathtub fitting being coupled to an external lateral side of a hat-shaped stringer.

Upper joint 336 is yet another example of an upper joint 36 in which a plurality of fasteners 76 are utilized to operatively couple the center upper wing panel 28 to the upper joint assembly 38 and to operatively couple the inboard compression fittings 68 directly across from corresponding outboard compression fittings 66. Moreover, vertical fasteners are utilized to couple directly together the inboard flange 62, the center upper skin 46, the horizontal flanges of the center upper stringers 44, and the horizontal flanges of the inboard compression fittings 68, and horizontal fasteners are utilized to couple directly together the vertical webs of the inboard compression fittings 68 and the vertical flanges of the center upper stringers 44. These fasteners facilitate a desired downward shift in the centroid associated with the compressive outward pressure within the vicinity of the upper joint during flight of an aircraft.

Turning finally to FIGS. 20-23, a fourth upper joint 436 is another example of an upper joint 36 that includes a stiffened outboard upper wing panel 24 constructed substantially of a CFRP, a stiffened center upper wing panel 28 constructed substantially of an aluminum alloy, and an upper joint assembly 38. The upper joint assembly includes an upper T-fitting 74 constructed of an aluminum alloy, a splice plate 70 constructed of a titanium alloy, a lower T-fitting 72 constructed of a titanium alloy, a plurality of outboard compression fittings 66 constructed of a titanium alloy, and a plurality of inboard compression fittings 68 constructed of an aluminum alloy. Like upper joints 136, 236, and 336, the stiffened outboard upper wing panel of upper joint 436 includes a plurality of outboard upper stringers 40 that may be described as blade stringers and/or as having generally T-shaped cross-sectional profiles. However, unlike upper joint 136 and upper joint 236, but similar to upper joint 336, the stiffened center upper wing panel 28 of upper joint 436 includes a plurality of center upper stringers 44 that may be described as hat-shaped stringers.

Also like upper joint 336, upper joint 436 is an example of an upper joint 36 in which each of the center upper stringers 44 is directly opposed to a corresponding outboard upper stringer 40. However, unlike upper joint 336, upper joint 436 is an example of an upper joint 36 in which the inboard compression fittings 68 take the form of bathtub fittings that are operatively coupled between the hat-shaped stringers and the lower flange 64 of the upper joint assembly 38, and with each bathtub fitting being coupled to the insides of the lateral sides of a hat-shaped stringer. Accordingly, the bathtub fittings of upper joint 436 may be described as internal bathtub fittings.

Upper joint 436 is yet another example of an upper joint 36 in which a plurality of fasteners 76 are utilized to operatively couple the center upper wing panel 28 to the upper joint assembly 38 and to operatively couple the inboard compression fittings 68 directly across from corresponding outboard compression fittings 66. Moreover, vertical fasteners are utilized to couple directly together the inboard flange 62, the center upper skin 46, the horizontal flanges of the center upper stringers 44, and the horizontal flanges of the inboard compression fittings 68, and horizontal fasteners are utilized to couple directly together the vertical webs of the inboard compression fittings 68 and the vertical flanges of the center upper stringers 44. These fasteners facilitate a desired downward shift in the centroid associated with the compressive outward pressure within the vicinity of the upper joint during flight of an aircraft.

Illustrative, non-exclusive examples of inventive subject matter according to the present disclosure are described in the following enumerated paragraphs:

A. A wing assembly for an aircraft, the wing assembly comprising:

a left wing box constructed substantially of a first material;

a right wing box constructed substantially of the first material; and a wing center section constructed substantially of a second material that is different from the first material.

A1. The wing assembly of paragraph A, wherein the first material has a first coefficient of thermal expansion; and wherein the second material has a second coefficient of thermal expansion that is greater than the first coefficient of thermal expansion.

A2. The wing assembly of any of paragraphs A-A1, wherein the first material is toward a cathodic end of a galvanic scale relative to the second material; and/or wherein the first material is more electronegative than the second material.

A3. The wing assembly of any of paragraphs A-A2, wherein the first material is a fiber reinforced composite material, and optionally a carbon fiber reinforced composite material.

A4. The wing assembly of any of paragraphs A-A3, wherein second material is a metal, and optionally an aluminum alloy.

A5. The wing assembly of any of paragraphs A-A4, further comprising:

a left upper joint assembly that defines a left upper joint with the left wing box and the wing center section; and a right upper joint assembly that defines a right upper joint with the right wing box and the wing center section;

wherein the left upper joint assembly and the right upper joint assembly are constructed at least partially, and optionally substantially, of a third material.

A5.1. The wing assembly of paragraph A5 when depending from paragraph A1, wherein the third material has a third coefficient of thermal expansion that is greater than the first coefficient of thermal expansion and less than the second coefficient of thermal expansion.

A5.2. The wing assembly of any of paragraphs A5-A5.1 when depending from paragraph A2, wherein the third material is between the first material and the second material on the galvanic scale; and/or wherein the third material is more electronegative than the second material and less electronegative than the first material.

A5.3. The wing assembly of any of paragraphs A5-A5.2, wherein the third material is a metal, and optionally a titanium alloy.

A5.4. The wing assembly of any of paragraphs A5-A5.3, wherein the left upper joint and the right upper joint each include the upper joint of any of paragraphs B-B4.10.

A6. The wing assembly of any of paragraphs A-A5.4, wherein the first material is not in contact with the second material.

A7. An aircraft, comprising:
a fuselage; and
the wing assembly of any of paragraphs A-A6.

B. An upper joint for a wing assembly of an aircraft, the upper joint comprising:
an outboard upper wing panel of an outboard wing box;
a center upper wing panel of a wing center section;
a rib that is located between the outboard wing box and the wing center section; and
an upper joint assembly operatively interconnecting the outboard upper wing panel, the center upper wing panel, and the rib.

B1. The upper joint of paragraph B,
wherein the upper joint assembly defines a mating plane between the outboard wing box and the wing center section;
wherein when the upper joint is in compression, the outboard upper wing panel expresses a compressive inward pressure toward the upper joint assembly;
wherein when the upper joint is in compression, the center upper wing panel expresses a compressive outward pressure toward the upper joint assembly; and
wherein a centroid of the compressive inward pressure across an acreage of the outboard upper wing panel and a centroid of the compressive outward pressure across an acreage of the center upper wing panel when extended across the mating plane do not directly coincide and/or meet at the mating plane, and/or wherein a/the centroid of the compressive inward pressure across an/the acreage of the outboard upper wing panel when extended across the mating plane intersects the mating plane below or above where a/the centroid of the compressive outward pressure across an/the acreage of the center upper wing panel when extended across the plane intersects the mating plane.

B1.1. The upper joint of paragraph B1,
wherein the upper joint assembly is configured to shift and/or direct the centroid of the compressive inward pressure to at least approximately, and optionally substantially and/or fully, coincide with and/or meet the centroid of the compressive outward pressure at the mating plane; and/or
wherein the upper joint assembly is configured to shift and/or direct the centroid of the compressive outward pressure to at least approximately, and optionally substantially and/or fully, coincide and/or meet the centroid of the compressive inward pressure at the mating plane.

B2. The upper joint of any of paragraphs B-B1.1,
wherein the outboard upper wing panel includes an outboard upper skin and a plurality of outboard upper stringers operatively coupled to the outboard upper skin; and
wherein the center upper wing panel includes a center upper skin and a plurality of center upper stringers operatively coupled to the center upper skin.

B2.1. The upper joint of paragraph B2, wherein at least a subset of the plurality of center upper stringers includes center upper stringers that are not directly opposed to corresponding outboard upper stringers of the plurality of outboard upper stringers at the upper joint assembly.

B2.2. The upper joint of any of paragraphs B2-B2.1, wherein for at least a substantial fore/aft span of the upper joint, every second center upper stringer of the plurality of center upper stringers is directly opposed to a corresponding outboard upper stringer of the plurality of outboard upper stringers at the upper joint assembly, optionally wherein every other second center upper stringer of the plurality of center upper stringers is not directly opposed to a corresponding outboard upper stringer of the plurality of outboard upper stringers.

B2.3. The upper joint of any of paragraphs B2-B2.2, wherein for at least a substantial fore/aft span of the upper joint, each of the plurality of outboard upper stringers is directly opposed to a corresponding center upper stringer of the plurality of center upper stringers at the upper joint assembly.

B2.4. The upper joint of any of paragraphs B2-B2.3, wherein for at least a substantial fore/aft span of the upper joint, the plurality of center upper stringers consists essentially of approximately twice as many stringers as the plurality of outboard upper stringers.

B2.5. The upper joint of any of paragraphs B2-B2.4, wherein the plurality of outboard upper stringers comprises blade stringers, Z-stringers, and/or I-stringers, optionally consists essentially of blade stringers, Z-stringers, and/or I-stringers, and optionally consists of blade stringers, Z-stringers, and/or I-stringers.

B2.6. The upper joint of any of paragraphs B2-B2.4, wherein the plurality of center upper stringers comprises one or more of blade stringers, Z-stringers, and/or I-stringers, optionally consists essentially of one or more of blade stringers, Z-stringers, and/or I-stringers, and optionally consists of one or more of blade stringers, Z-stringers, and/or I-stringers.

B2.7. The upper joint of any of paragraphs B2-B2.5, wherein the plurality of center upper stringers comprises hat-shaped stringers, optionally consists essentially of hat-shaped stringers, and optionally consists of hat-shaped stringers.

B2.8. The upper joint of any of paragraphs B2-B2.7, wherein a first subset of the plurality of center upper stringers is operatively coupled to the upper joint assembly, and wherein a second subset of the plurality of center upper stringers is not operatively coupled to the upper joint assembly and/or terminates without being directly coupled to the upper joint assembly.

B2.9. The upper joint of any of paragraphs B2-B2.8, wherein for at least a substantial span of the upper joint, every second center upper stringer of the plurality of center upper stringers is not coupled directly to the upper joint assembly and/or terminates without being directly coupled to the upper joint assembly.

B3. The upper joint of any of paragraphs B-B2.9, wherein the upper joint assembly includes:
an outboard flange operatively coupled to the outboard upper wing panel;
an inboard flange operatively coupled to the center upper wing panel;
a lower flange operatively coupled to the rib;
a plurality of outboard compression fittings operatively coupled between the outboard upper wing panel and the lower flange; and
a plurality of inboard compression fittings operatively coupled between the center upper wing panel and the lower flange.

B3.1. The upper joint of paragraph B3, wherein the upper joint assembly includes:
a splice plate, wherein the splice plate defines the outboard flange and the inboard flange; and
a lower T-fitting operatively coupled to the splice plate, wherein the lower T-fitting defines the lower flange.

B3.1.1. The upper joint of paragraph B3.1, wherein the upper joint assembly further includes:

an upper T-fitting operatively coupled to the splice plate opposite the lower T-fitting.

B3.2. The upper joint of any of paragraphs B3-B3.1.1, wherein the plurality of inboard compression fittings comprises bathtub fittings, optionally consists essentially of bathtub fittings, and optionally consists of bathtub fittings.

B3.3. The upper joint of any of paragraphs B3-B3.2, wherein the plurality of inboard compression fittings comprises half-bathtub fittings, optionally consists essentially of half-bathtub fittings, and optionally consists of half-bathtub fittings.

B3.4. The upper joint of any of paragraphs B3-B3.3, wherein the plurality of inboard compression fittings comprises paddle fittings, optionally consists essentially of paddle fittings, and optionally consists of paddle fittings.

B3.5. The upper joint of any of paragraphs B3-B3.4 when depending from paragraph B2, wherein each of at least a subset of the plurality of inboard compression fittings is operatively coupled to the center upper skin, the lower flange, and two of the plurality of center upper stringers.

B3.6. The upper joint of any of paragraphs B3-B3.5 when depending from paragraph B2, wherein the plurality of center upper stringers includes a subset of center upper stringers that are not coupled directly to an inboard compression fitting of the plurality of inboard compression fittings.

B3.7. The upper joint of any of paragraphs B3-B3.6 when depending from paragraph B2, wherein for at least a substantial fore/aft span of the upper joint, every second center upper stringer of the plurality of center upper stringers is not coupled directly to an inboard compression fitting of the plurality of inboard compression fittings.

B3.8. The upper joint of any of paragraphs B3-B3.7, wherein for at least a substantial fore/aft span of the upper joint, each of the plurality of inboard compression fittings is coupled to the lower flange directly across from an outboard compression fitting of the plurality of outboard compression fittings.

B3.9. The upper joint of any of paragraphs B3-B3.8, wherein the upper joint assembly further includes a plurality of fasteners, wherein at least a subset of fasteners of the plurality of fasteners directly couples an outboard compression fitting of the plurality of outboard compression fittings and an inboard compression fitting of the plurality of inboard compression fittings to the lower flange.

B3.10. The upper joint of any of paragraphs B3-B3.9 when depending from paragraph B2, wherein the upper joint assembly further includes a plurality of fasteners, wherein at least a subset of fasteners of the plurality of fasteners directly couple together the inboard flange, the center upper skin, horizontal flanges of the center upper stringers, and horizontal flanges of the inboard compression fittings.

B3.11. The upper joint of any of paragraphs B3-B3.10 when depending from paragraph B2, wherein the upper joint assembly further includes a plurality of fasteners, wherein at least a subset of the fasteners of the plurality of fasteners directly couple together vertical webs of the inboard compression fittings 68 and vertical flanges of the center upper stringers.

B3.12. The upper joint of any of paragraphs B-B3.11, wherein each of the plurality of outboard compression fittings is coupled to the lower flange directly across from two of the plurality of inboard compression fittings.

B3.13. The upper joint of any of paragraphs B-B3.11, wherein for at least a substantial fore/aft span of the upper joint, each of the plurality of outboard compression fittings is coupled to the lower flange directly across from one of the plurality of inboard compression fittings.

B4. The upper joint of any of paragraphs B-B3.13,
wherein the outboard upper wing panel is constructed substantially of a first material;
wherein the center upper wing panel is constructed substantially of a second material that is different from the first material; and
wherein the upper joint assembly is constructed at least partially, optionally substantially, of a third material that is different from the first material and the second material.

B4.1. The upper joint of paragraph B4, wherein the rib is constructed substantially of the second material.

B4.2. The upper joint of any of paragraphs B4-B4.1,
wherein the first material has a first coefficient of thermal expansion;
wherein the second material has a second coefficient of thermal expansion that is greater than the first coefficient of thermal expansion; and the third material has a third coefficient of thermal coefficient that is greater than the first coefficient of thermal expansion and less than the second coefficient of thermal expansion.

B4.3. The upper joint of any of paragraphs B4-B4.2,
wherein the first material is toward a cathodic end of a galvanic scale relative to the second material, and wherein the third material is between the first material and the second material on the galvanic scale; and/or
wherein the first material is more electronegative than the third material, and wherein the third material is more electronegative than the second material.

B4.4. The upper joint of any of paragraphs B4-B4.3, wherein the first material is a fiber reinforced composite material, and optionally a carbon fiber reinforced composite material.

B4.5. The upper joint of any of paragraphs B4-B4.4, wherein the second material is a metal, and optionally an aluminum alloy.

B4.6. The upper joint of any of paragraphs B4-B4.5, wherein the third material is a metal, and optionally a titanium alloy.

B4.7. The upper joint of any of paragraphs B4-B4.6 when depending from paragraph B3, wherein the outboard flange, the inboard flange, and the lower flange are constructed of the third material.

B4.8. The upper joint of any of paragraphs B4-B4.7 when depending from paragraph B3, wherein the plurality of outboard compression fittings is constructed of the third material.

B4.9. The upper joint of any of paragraphs B4-B4.7 when depending from paragraph B3, wherein the plurality of inboard compression fittings is constructed of the second material.

B4.10. The upper joint of any of paragraphs B4-B4.7 when depending from paragraph B3.1.1, wherein the upper T-fitting is constructed of the second material.

B5. An aircraft, comprising:
a fuselage; and
a wing assembly operatively coupled to the fuselage, wherein the wing assembly includes:
a left wing box;
a right wing box;
a wing center section;
an upper joint of any of paragraphs B-B10 interconnecting the left wing box and the wing center section; and
an upper joint of any of paragraphs B-B10 interconnecting the right wing box and the wing center section.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses disclosed herein are not required to all apparatuses, and the present disclosure includes all novel and non-obvious combinations and subcombinations of the various elements disclosed herein. Moreover, one or more of the various elements disclosed herein may define independent inventive subject matter that is separate and apart from the whole of a disclosed apparatus. Accordingly, such inventive subject matter is not required to be associated with the specific apparatuses that are expressly disclosed herein, and such inventive subject matter may find utility in apparatuses that are not expressly disclosed herein.

The invention claimed is:

1. An upper joint for a wing assembly of an aircraft, the upper joint comprising:
    an outboard upper wing panel of an outboard wing box, wherein the outboard upper wing panel includes an outboard upper skin and a plurality of outboard upper stringers operatively coupled to the outboard upper skin;
    a center upper wing panel of a wing center section, wherein the center upper wing panel includes a center upper skin and a plurality of center upper stringers operatively coupled to the center upper skin;
    a rib that is located between the outboard wing box and the wing center section; and
    an upper joint assembly operatively interconnecting the outboard upper wing panel, the center upper wing panel, and the rib;
    wherein for a first substantial fore/aft span of the upper joint:
        the plurality of outboard upper stringers comprises hat-shaped stringers;
        a first subset of the plurality of center upper stringers is operatively coupled to the upper joint assembly, wherein the first subset of the plurality of center upper stringers comprises hat-shaped stringers; and
        a second subset of the plurality of center upper stringers terminates without being directly coupled to the upper joint assembly, wherein the second subset of the plurality of center upper stringers comprises blade stringers, Z-stringers, or I-stringers.

2. The upper joint of claim 1, wherein the center upper stringers of the second subset of the plurality of center upper stringers are not directly opposed to corresponding outboard upper stringers of the plurality of outboard upper stringers at the upper joint assembly.

3. An aircraft, comprising:
    a fuselage; and
    a wing assembly operatively coupled to the fuselage, wherein the wing assembly includes:
        a left wing box;
        a right wing box;
        a wing center section; and
        two upper joints according to claim 1, including a left upper joint and a right upper joint, wherein the left upper joint interconnects the left wing box and the wing center section, and wherein the right upper joint interconnects the right wing box and the wing center section.

4. The upper joint of claim 1, wherein the upper joint assembly includes:
    an outboard flange operatively coupled to the outboard upper wing panel;
    an inboard flange operatively coupled to the center upper wing panel;
    a lower flange operatively coupled to the rib;
    a plurality of outboard compression fittings operatively coupled between the outboard upper wing panel and the lower flange; and
    a plurality of inboard compression fittings operatively coupled between the center upper wing panel and the lower flange.

5. The upper joint of claim 4, wherein the upper joint assembly includes:
    a splice plate, wherein the splice plate defines the outboard flange and the inboard flange; and
    a lower T-fitting operatively coupled to the splice plate, wherein the lower T-fitting defines the lower flange.

6. The upper joint of claim 5, wherein the upper joint assembly further includes:
    an upper T-fitting operatively coupled to the splice plate opposite the lower T-fitting.

7. The upper joint of claim 5,
    wherein the outboard upper wing panel is constructed substantially of a first material;
    wherein the center upper wing panel is constructed substantially of a second material that is different from the first material; and
    wherein the splice plate and the lower T-fitting are constructed of a third material that is different from the first material and the second material.

8. The upper joint of claim 7, wherein the first material is a fiber reinforced composite material, wherein the second material is an aluminum alloy, and wherein the third material is a titanium alloy.

9. The upper joint of claim 1, wherein for a second substantial fore/aft span of the upper joint:
    the plurality of outboard upper stringers comprises blade stringers, Z-stringers, or I-stringers;
    a third subset of the plurality of center upper stringers is operatively coupled to the upper joint assembly, wherein the third subset of the plurality of center upper stringers comprises blade stringers, Z-stringers, or I-stringers; and
    a fourth subset of the plurality of center upper stringers terminates without being directly coupled to the upper joint assembly, wherein the fourth subset of the plurality of center upper stringers comprises blade stringers, Z-stringers, or I-stringers.

10. The upper joint of claim 9, wherein the center upper stringers of the fourth subset of the plurality of center upper stringers are not directly opposed to corresponding outboard upper stringers of the plurality of outboard upper stringers at the upper joint assembly.

11. An upper joint for a wing assembly of an aircraft, the upper joint comprising:
   an outboard upper wing panel of an outboard wing box, wherein the outboard upper wing panel includes an outboard upper skin and a plurality of outboard upper stringers operatively coupled to the outboard upper skin;
   a center upper wing panel of a wing center section, wherein the center upper wing panel includes a center upper skin and a plurality of center upper stringers operatively coupled to the center upper skin;
   a rib that is located between the outboard wing box and the wing center section; and
   an upper joint assembly operatively interconnecting the outboard upper wing panel, the center upper wing panel, and the rib;
   wherein for a first substantial fore/aft span of the upper joint:
     the plurality of outboard upper stringers comprises hat-shaped stringers;
     a first subset of the plurality of center upper stringers is operatively coupled to the upper joint assembly, wherein the first subset of the plurality of center upper stringers comprises hat-shaped stringers; and
     a second subset of the plurality of center upper stringers terminates without being directly coupled to the upper joint assembly, wherein the center upper stringers of the second subset of the plurality of center upper stringers comprise blade stringers, Z-stringers, or I-stringers and are not directly opposed to corresponding outboard upper stringers of the plurality of outboard upper stringers at the upper joint assembly; and
   wherein for a second substantial fore/aft span of the upper joint:
     the plurality of outboard upper stringers comprises blade stringers, Z-stringers, or I-stringers;
     a third subset of the plurality of center upper stringers is operatively coupled to the upper joint assembly, wherein the third subset of the plurality of center upper stringers comprises blade stringers, Z-stringers, or I-stringers; and
     a fourth subset of the plurality of center upper stringers terminates without being directly coupled to the upper joint assembly, wherein the center upper stringers of the fourth subset of the plurality of center upper stringers comprise blade stringers, Z-stringers, or I-stringers and are not directly opposed to corresponding outboard upper stringers of the plurality of outboard upper stringers at the upper joint assembly.

12. An aircraft, comprising:
   a fuselage; and
   a wing assembly operatively coupled to the fuselage, wherein the wing assembly includes:
     a left wing box;
     a right wing box;
     a wing center section; and
     two upper joints according to claim 11, including a left upper joint and a right upper joint, wherein the left upper joint interconnects the left wing box and the wing center section, and wherein the right upper joint interconnects the right wing box and the wing center section.

13. The upper joint of claim 11, wherein the upper joint assembly includes:
   an outboard flange operatively coupled to the outboard upper wing panel;
   an inboard flange operatively coupled to the center upper wing panel;
   a lower flange operatively coupled to the rib;
   a plurality of outboard compression fittings operatively coupled between the outboard upper wing panel and the lower flange; and
   a plurality of inboard compression fittings operatively coupled between the center upper wing panel and the lower flange.

14. The upper joint of claim 13, wherein the upper joint assembly includes:
   a splice plate, wherein the splice plate defines the outboard flange and the inboard flange; and
   a lower T-fitting operatively coupled to the splice plate, wherein the lower T-fitting defines the lower flange.

15. The upper joint of claim 14, wherein the upper joint assembly further includes:
   an upper T-fitting operatively coupled to the splice plate opposite the lower T-fitting.

16. The upper joint of claim 14,
   wherein the outboard upper wing panel is constructed substantially of a first material;
   wherein the center upper wing panel is constructed substantially of a second material that is different from the first material; and
   wherein the splice plate and the lower T-fitting are constructed of a third material that is different from the first material and the second material.

17. The upper joint of claim 16, wherein the first material is a fiber reinforced composite material, wherein the second material is an aluminum alloy, and wherein the third material is a titanium alloy.

18. An upper joint for a wing assembly of an aircraft, the upper joint comprising:
   an outboard upper wing panel of an outboard wing box, wherein the outboard upper wing panel includes an outboard upper skin and a plurality of outboard upper stringers operatively coupled to the outboard upper skin;
   a center upper wing panel of a wing center section, wherein the center upper wing panel includes a center upper skin and a plurality of center upper stringers operatively coupled to the center upper skin;
   a rib that is located between the outboard wing box and the wing center section; and
   an upper joint assembly operatively interconnecting the outboard upper wing panel, the center upper wing panel, and the rib;
   wherein for a first substantial fore/aft span of the upper joint:
     the plurality of outboard upper stringers comprises hat-shaped stringers;
     a first subset of the plurality of center upper stringers is operatively coupled to the upper joint assembly, wherein the first subset of the plurality of center upper stringers comprises hat-shaped stringers; and
     a second subset of the plurality of center upper stringers terminates without being directly coupled to the upper joint assembly, wherein the second subset of the plurality of center upper stringers are not hat-shaped stringers.

19. The upper joint of claim 18, wherein for a second substantial fore/aft span of the upper joint:
   the plurality of outboard upper stringers are not hat-shaped stringers;
   a third subset of the plurality of center upper stringers is operatively coupled to the upper joint assembly, wherein the third subset of the plurality of center upper stringers are not hat-shaped stringers; and a fourth subset of the plurality of center upper stringers terminates without being directly coupled to the upper joint assembly, wherein the fourth subset of the plurality of center upper stringers are not hat-shaped stringers.

20. An aircraft, comprising:

a fuselage; and a wing assembly operatively coupled to the fuselage, wherein the wing assembly includes:

a left wing box;

a right wing box;

a wing center section; and two upper joints according to claim 19, including a left upper joint and a right upper joint, wherein the left upper joint interconnects the left wing box and the wing center section, and wherein the right upper joint interconnects the right wing box and the wing center section.

* * * * *